(12) United States Patent
Park

(10) Patent No.: US 11,435,455 B2
(45) Date of Patent: Sep. 6, 2022

(54) MULTI-PHASE CORRELATION VECTOR SYNTHESIS RANGING METHOD AND APPARATUS

(71) Applicant: Chun Soo Park, Seoul (KR)

(72) Inventor: Chun Soo Park, Seoul (KR)

(*) Notice: Subject to any disclaimer, the term of this patent is extended or adjusted under 35 U.S.C. 154(b) by 0 days.

(21) Appl. No.: 17/572,173

(22) Filed: Jan. 10, 2022

(65) Prior Publication Data

US 2022/0229165 A1 Jul. 21, 2022

(30) Foreign Application Priority Data

Jan. 14, 2021 (KR) .................. 10-2021-0005612
Jul. 1, 2021 (KR) .................. 10-2021-0086458

(51) Int. Cl.
*G01S 7/493* (2006.01)
*G01S 17/36* (2006.01)
(Continued)

(52) U.S. Cl.
CPC .............. *G01S 7/493* (2013.01); *G01S 17/36* (2013.01); *G01S 17/86* (2020.01); *G06F 3/0346* (2013.01); *G01S 13/36* (2013.01); *G01S 15/36* (2013.01)

(58) Field of Classification Search
CPC .... G01S 7/4861; G01S 7/4866; G01S 7/4912; G01S 7/4913; G01S 7/4915; G01S 7/493;
(Continued)

(56) References Cited

U.S. PATENT DOCUMENTS 10,031,078 B2   7/2018   Ritter et al.
10,638,118 B2   4/2020   Van Nieuwenhove et al.
(Continued)

FOREIGN PATENT DOCUMENTS

CN   112130140 A   12/2020
JP   2014163753 A   9/2014
(Continued)

OTHER PUBLICATIONS

Sebastian Werner et al., "A new operation mode for depth-focused high-sensitivity ToF range finding", Sep. 6 2019, Electrical Engineering and Systems Science, Cornell University.
(Continued)

*Primary Examiner* — Yuqing Xiao
*Assistant Examiner* — Benjamin Richard Hebert
(74) *Attorney, Agent, or Firm* — LRK Patent Law Firm

(57) ABSTRACT

A TOF ranging system based on a multi-phase correlation vector synthesis ranging method is presented. The method is a generalized expansion from conventional 2- or 4-phase correlations to arbitrary N-phase correlations in finding in-phase (I) and quadrature-phase (Q) signals of the reflected signal at the receiver, where N is an odd number greater than or equal to 3. The correlation vectors of the output of multi-phase correlators are processed by a zero-force synthesizer to produce optimal I and Q signals, from which the phase delay or ranging information is calculated. Embodiments disclose necessary components in realization of the method, such as half clock shifter, full clock shifter, dual edge reference pulse generator, and correlation integrator. The TOF ranging method enables the construction of finer and more accurate TOF systems like 3D imaging systems, 3D sonar imaging systems, or 3D touchless pointer systems.

19 Claims, 30 Drawing Sheets

(51) Int. Cl.
  *G06F 3/0346* (2013.01)
  *G01S 17/86* (2020.01)
  *G01S 15/36* (2006.01)
  *G01S 13/36* (2006.01)

(58) Field of Classification Search
  CPC .......... G01S 13/36; G01S 15/36; G01S 17/36; G01S 17/86; G06F 3/0346
  See application file for complete search history.

(56) References Cited

U.S. PATENT DOCUMENTS

| | | | |
|---|---|---|---|
| 11,143,525 B1 | 10/2021 | Park | |
| 2012/0025812 A1* | 2/2012 | Dolsak | G01D 5/2448 324/207.25 |
| 2015/0048242 A1* | 2/2015 | Remillard | G01D 5/3473 250/231.14 |
| 2017/0024894 A1* | 1/2017 | Cardei | G01S 7/486 |
| 2021/0313379 A1* | 10/2021 | Yin | H01L 27/14656 |
| 2021/0356299 A1 | 11/2021 | Park | |

FOREIGN PATENT DOCUMENTS

| | | |
|---|---|---|
| JP | 2018-194527 A | 12/2018 |
| JP | 2019-120613 A | 7/2019 |
| KR | 10-2001-0068732 A | 7/2001 |
| KR | 10-0893139 B1 | 4/2009 |
| KR | 10-2011-0092930 A | 8/2011 |
| KR | 10-2019-0089292 A | 7/2019 |
| KR | 10-2020-0004808 A | 1/2020 |
| KR | 10-2067938 B1 | 1/2020 |
| KR | 10-2144254 B1 | 8/2020 |
| KR | 10-2182299 B1 | 11/2020 |
| WO | 2014/199609 A1 | 2/2017 |
| WO | 2020/149489 A1 | 7/2020 |

OTHER PUBLICATIONS

Prior Art Examination Report, dated Aug. 2, 2021, for Korean Patent Application No. 10-2021-00876458 which corresponds to the above-identified U.S. application.

Prior Art Examination Report, dated Aug. 9, 2021, for Korean Patent Application No. 10-2021-00876458 which corresponds to the above-identified U.S. application.

Prior Art Examination Report, dated Aug. 2, 2021, for Korean Patent Application No. 10-2021-0086458 which corresponds to the above-identified U.S. application.

Prior Art Examination Report, dated Aug. 9, 2021, for Korean Patent Application No. 10-2021-0086458 which corresponds to the above-identified U.S. application.

* cited by examiner

MULTI-PHASE CORRELATION VECTOR SYNTHESIS RANGING METHOD AND APPARATUS

CROSS-REFERENCE TO RELATED APPLICATION(S)

This application claims priority to Korean Patent Application No. 10-2021-0005612, filed on Jan. 14, 2021, and No. 10-2021-0086458, filed on Jul. 1, 2021, the entire disclosure of which is incorporated herein by reference for all purposes.

BACKGROUND

1. Technical Field

The claimed subject matter relates to distance ranging, particularly a novel multi-phase correlation and vector synthesis method and apparatus for detection of a delayed phase in reflected signals from an object of interest.

2. Description of Related Art

In Time-of-Flight (TOF) ranging, the distance between the transmitter and the reflected object is calculated from the phase difference (or phase delay) between the transmitted and received signals. In general, radio frequency, micro wave, optical, or ultrasonic signals are used for the various TOF applications.

The recent advances in semiconductor technology allows to realize TOF cameras in mobile devices. TOF cameras measure the phase delay of reflected infrared (IR) light from the transmitted signal. To detect the phase delay of the reflected signal, the conventional in-phase and quadrature-phase demodulation (I/Q demodulation) or matched filter techniques are generally and typically used.

The principle of the I/Q demodulation phase detector (or correlation phase detector) is illustrated in FIG. 1A. When a periodic high frequency signal $s(t)=A \sin(\omega t)$ with its period $T_s$ is transmitted toward an object (2) from the transmitter (1), the reflected signal from the object is received at the receiver, where w and A denotes the angular frequency and amplitude of the transmitted signal, respectively. The reflected and received signal with its period $T_r$ can be expressed as $r(t)=B \sin(\omega t-\emptyset)$, where B is the amplitude of the received signal and $\emptyset$ is the phase delay between the transmitted and the reflected signal that is proportional to the distance D between the transmitter and the object. The signal period of the reflected signal is safely assumed to be the same as that of the transmitter signal, $T_s=T_r$, as well as its frequency for most practical applications.

The phase delay between the transmitted and received signal is illustrated in FIG. 1B. Let $\Delta T$ be the time delay between the time when s(t) is transmitted and when the reflected signal is received at the receiver, the phase delay becomes $\emptyset=\omega \Delta T$, and the distance D between the transmitter and the object is calculated from the equation $$D = \frac{c\Delta T}{2},$$

where c is the speed of light.

To detect the phase delay from the received signal, two correlators consisting of in-phase correlator #1 (3) and quadrature-phase correlator #2 (4) are conventionally employed at the receiver as illustrated in FIG. 1A. Namely, correlations are performed between the received signal and the two orthogonal signal components of the transmitting signal, $\sin(\omega t)$ and $\cos(\omega t)=\sin(\omega t+90°)$.

When considering only the phase $\emptyset$ of the received signal $\sin(\omega t-\emptyset)$, the correlation with a local copy of transmitting signal $\sin(\emptyset t)$ having a phase delay $(\tau)$ over one period in continuous time is expressed in EQ. (1) as a function of the phase delay $(\tau)$ in degree. Correlation vector function $C(\tau)$ as a function of the phase delay T is as follows:

$$C(\tau) = \lim_{T \to \infty} \frac{1}{T} \int_{\frac{T}{2}}^{\frac{T}{2}} \sin(\omega t - \emptyset)\sin(\omega t + \tau) dt \quad \text{EQ. (1)}$$

$$= 0.5 * \sin(\emptyset + \tau) \quad \text{EQ. (2)}$$

The in-phase component at the output of correlator #1 (3) is when phase delay $\tau=0°$, and becomes I=0.5*B sin($\Pi+0°$)=0.5*B sin($\emptyset$). The quadrature-phase component at the output of correlator #2 (4) is when the phase delay $\tau=90$, and becomes Q=0.5*B sin($\emptyset+90°$)=0.5*B cos($\emptyset$). The phase delay ($\emptyset$) of the received signal due to the flight time is calculated by taking the arc tangent of I/Q.

The reflected signals from an object of interest are generally very weak and heavily interfered. Especially in applications like 3-dimensional (3D) imaging TOF system, the phase delay variation of the received signal should be linear with respect to the distance variation between the transmitter and the object. A fine phase delay detection at the receiver side is also necessary to draw fine 3D image, which requires a high phase sensitivity in I/Q signal detection. Moreover, any distortion or fluctuation of the received signal directly affects the I/Q signal. Therefore, the receiver correlator performance substantially affects the performance of the TOF ranging system. In this regard, the design and implementation of the receiver correlator that provides a high linearity and sensitivity is a primary factor in TOF ranging systems.

As expressed in below EQ. (3), the phase sensitivity of the conventional I/Q demodulator can be defined as a slope of the output values of the correlator at two distanced phase positions; namely, the deviation between the correlation values at two distanced phase positions, $C(\tau 2)-C(\tau 1)$, that is divided by the difference between the two phases in degree.

$$\text{Phase Sensitivity} = \frac{C(\tau 2) - C(\tau 1)}{\tau 2 - \tau 1} = \frac{\partial C(\tau)}{\partial \tau} \quad \text{EQ. (3)}$$

The phase sensitivity of the I correlator can be calculated such that $\Delta CI/(0°-180°)$, where $\Delta CI=C(0)-C(180)$ is the deviation of correlation values at phase positions 0° and 180°. Likewise, the phase sensitivity of the Q correlator can be calculated such that $\Delta CQ/(90°-270°)$, where $\Delta CQ=C(90)-C(270)$ is the deviation of correlation values at phase positions 90° and 270°.

The U.S. Pat. No. 10,031,078B discloses a method of identifying the position of a moving object by taking the derivatives of in-phase and quadrature-phase signals of I/Q demodulators. By taking the derivative, the static signal component is removed and the relative phase sensitivity can be improved in ranging of a moving object. However, the absolute phase information is unknown and the proportional relationship between the phase variation and the distance variation is not necessarily guaranteed.

In order to increase the sensitivity of image depth (or phase sensitivity), Sebastian Werner et al. ("Anew operation mode for depth-focused high-sensitivity TOF range finding," arXiv:1909.02759v1, submitted on Sep. 6, 2019, Electrical Engineering and Systems Science, Cornell University) proposed a measurement scheme whereby the correlation vector function represented by EQ. (1) was modulated by a certain frequency at phase positions 0° and 90° ranges. One of disadvantages of this scheme, however, is that the resultant measured phase delay varies based on the types of the received signal shape. Especially for the square-wave type signal, a trivial phase is measured in some periods of the signal. Other shortcomings are that the measurement would be degraded under multi-path interferences and is much dependent on the signal frequency modulated. Moreover, the phase variation of the received signal is not linear with respect to the distance variation, which may limit to draw a smooth 3D image in detail.

The conventional I/Q demodulation technique based on the orthogonal signal basis is an optimal detection when the communications channel through which the received signal propagates is assumed to be additive white Gaussian noise (AWGN). However, in most practical communications or range findings, the radio signal propagated and/or reflected from the object faces various phenomena such as refraction, diffraction, scattering, fading, as well as AWGN noise. For heavily impaired received signals, the phase detection or recovery based on the conventional I/Q demodulator does not provide an optimal solution in the sense of minimizing the distortion and interference in the received signals.

The present invention has been made in light of the aforementioned background, and discloses a novel method and apparatus to obtain significantly improved in-phase and quadrature-phase signal components of the received signal. The in-phase and quadrature-phase signal components are synthesized from the output correlation vectors of multi-phase correlators based on the principle of the zero-force synthesis method, which is disclosed in US2021/0356299 and KR10-2067938 by the present inventor.

SUMMARY OF THE INVENTION

The following presents a simplified summary in order to provide a basic understanding of some aspects described herein.

In general aspect, exemplary embodiments provide methods and apparatus of TOF ranging systems employing an arbitrary number of correlations (referred to as "multi-phase correlation") from the conventional 4-phase correlations with orthogonal basis 2-phase signals and their 180 shifted complementary signals.

According to an aspect of the exemplary embodiments, the method of N-phase correlations and vector synthesis ranging includes: generating a correlation clock, of which the frequency is p*N times of the transmitting (TX) signal frequency, wherein p is an integer greater than or equal to 1 and N is preferred to be an odd number greater than or equal to 3; generating a transmitter (TX) control signal from a clock divider that divides the correlation clock by p*N, wherein the TX control signal changes its phase by 180° at every p*N/2 cycles of the correlation clock; generating N number of delay taps control signals from the TX control signal to control the correlation time of the N-phase correlations, where the start phase positions of the N delay taps are set to be N equally divided phase positions over one period (360°) of the transmitting signal; obtaining N correlation vectors $V_1, V_2, \ldots, V_N$ by accumulating over one or multiple signal periods; synthesizing in-phase (I) and quadrature-phase (Q) signals from N correlation vectors by the zero-force synthesis using synthesis coefficients and gain; and determining the distance information from the phase of the I and Q signals.

The synthesizing of the I and Q signals by the zero-force synthesis is a $1^{st}$ order linear transformation after may applying K times to synthesis coefficients, where K is a synthesis gain.

The generation the TX control signal is to be active at the rising edge (or falling edge) of the correlation clock and be inactive at the falling edge (or rising edge) of the correlation clock after p*N/2 clock cycles when p is an odd number.

The generation of the N number of delay taps control signals may include a certain time-delay offset +τd applied at reference delay taps positions, wherein the reference delay taps positions are N equally divided phase positions over one period (360°) of the transmitting signal.

According to an aspect of the exemplary embodiments, the N-phase correlations and vector synthesis ranging apparatus includes: a correlator array that comprises an N number of correlators and generates the N number of correlation vectors by integration of more than one period of the received signal, where the N number of correlators start correlations sequentially at the N equally divided phase positions over one period (360°) of the transmitting signal, where N is preferred to be an odd number greater than or equal to 3; a correlation clock generator for generating a clock of p*N times of the transmitting (TX) control signal frequency, where p is an integer greater than or equal to 1; a reference pulse generator for generating a correlation reference pulse and a TX control signal from a clock divider that divides the correlation clock by p*N, where the phase of the correlation reference pulse and the TX control signal shifts by 180° at every p*N/2 clock cycles of the correlation clock; a correlation pulse generator for generating a correlation pulse, where the correlation pulse comprises the N number of pulses, of which phases are the same as those of delay taps control signals, where each of the N number of delay taps control signals is sequentially p cycles of the correlation clock shifted with reference to the TX control signal; a correlation integrator for generation of the N number of delay taps control signals in obtaining the correlation vectors by accumulating signals during more than one period.

The zero-force synthesizer generates the I and Q signals by performing 1' order linear transformations to the correlation vectors after may applying K times to the synthesis coefficients, where K is a synthesis gain. The zero-force synthesizer may be implemented by differential OP-amp circuitry.

As an exemplary application, a novel TOF method utilizing the multi-phase correlation vector synthesis method is presented. It is shown that compared with ±16.5 cm inherent measured error range of the conventional 4-phase correlations, the inherent measured error range is around ±1.05 cm for the 5-phase (N=5) correlation vector synthesis TOF system when 10 Mhz signal is transmitted.

Other exemplary applications of employing the novel TOF method, such as a 3D imaging system, a 3D sonar system, and a touchless pointer system are presented.

One or more of the above-disclosed embodiments, in addition to certain alternatives, are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

DETAILED DESCRIPTION OF THE INVENTION

Figure 1A:
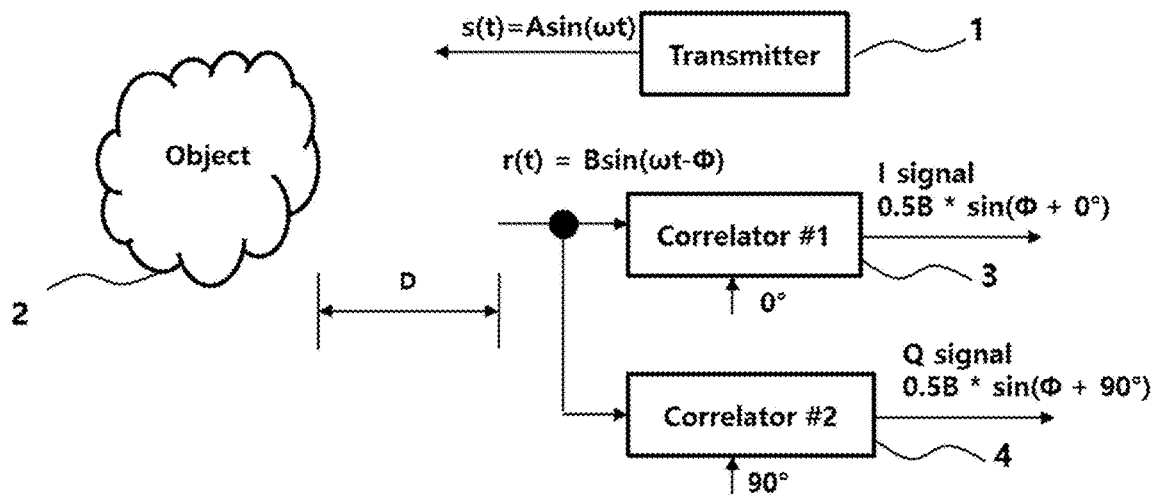
FIG. 1A illustrates the conventional phase detector based on the correlation of the I/Q signals.
Figure 1B:
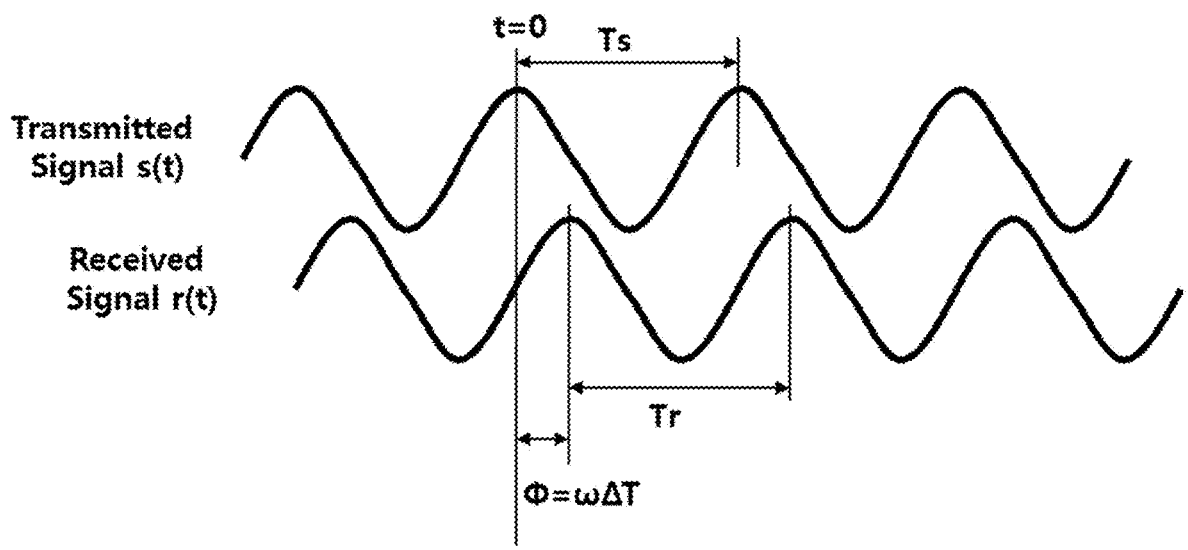
FIG. 1B illustrates a phase delay between the transmitted signal and received signal.

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

To facilitate understanding the present invention, a following glossary of terms is provided. The glossary is intended to provide the reader with a general understanding of various terms as they are used in the specification and claims, and is not intended to limit the scope of these terms.

Glossary of Terms

Dual edge clock—The term "dual edge clock" as used herein in this specification, is defined as a clock signal that drives or activates a device connected to the clock signal at both rising and falling edges.

Dual pulse—The term "dual pulse" as used herein in this specification, is defined as two clock signals that constitute the $1^{st}$ clock of the rising edge clock and the $2^{nd}$ clock of the falling edge clock.

Falling edge clock—The term "falling edge clock" as used herein in this specification, is defined as a clock signal that drives or activates a device connected to the clock signal at its falling edge, where the falling edge is defined as a time when the clock signal makes a transition from the high level to the low level.

Full clock—The term "full clock" as used herein in this specification, is defined as a clock signal that changes the state of a device connected to the clock signal synchronized at either rising or falling edge of the clock, therefore, when the device is synchronized at the falling (or the rising) edge of the clock, the device changes its state at the falling (or rising) edge of the next clock cycle.

Full clock shifter—The term "full clock shifter" as used herein in this specification, is defined as a digital logic circuit by which the incoming input clock signal is one full clock (one full period) shifted.

Half clock—The term "half clock" as used herein in this specification, is defined as a clock signal that changes the state of a device connected to the clock signal with a half clock shifted; therefore, when the device is synchronized at the falling (or rising) edge of the clock, the device changes its state at the rising (or falling) edge of the next clock cycle.

Half clock shifter—The term "half clock shifter" as used herein in this specification, is defined as a digital logic circuit by which the incoming input clock signal is a half clock (a half period) shifted.

Multi-phase—The term "multi-phase" as used herein in this specification, is defined as the number of phases of correlators, or delay taps, that is typically greater than or equal to 3. In conventional TOF systems, typically two-phases or 4-phases correlators are used.

N-phase—The term "N-phase" as used herein in this specification, is defined as an N number of phases that are equally divided angles over one period of 360° by N.

Rising edge clock—The term "rising edge clock" as used herein in this specification, is defined as a clock signal that drives or activates a device connected to the clock signal at its rising edge, where the rising edge is defined as a time when the clock signal makes a transition from the low level to high level.

Synthesis coefficients—The term "synthesis coefficients" as used herein in this specification, is defined as a set of numbers that is selected from the zero-force transformation, and is utilized in the synthesis of two-phase orthogonal signals. The method of selecting synthesis coefficients is disclosed in US2021/0356299.

Zero-force synthesis—The term "zero-force synthesis" as used herein in this specification, is defined as a $1^{st}$ order linear transformation in mathematics or electrical engineering such that an N number of sequentially phase delayed signals are transformed into two-phase orthogonal signals in zero-forcing criterion. The method and apparatus of the zero-force synthesis is disclosed in US2021/0356299.

In what follows, the principle of multi-phase correlation vector synthesis method and apparatus is explained for N=5, namely, 5-phase correlations vector synthesis case. Generalized arbitrary N-phase correlations with N correlators can be easily derived from the exemplary 5-phase correlations.

Figure 2A:
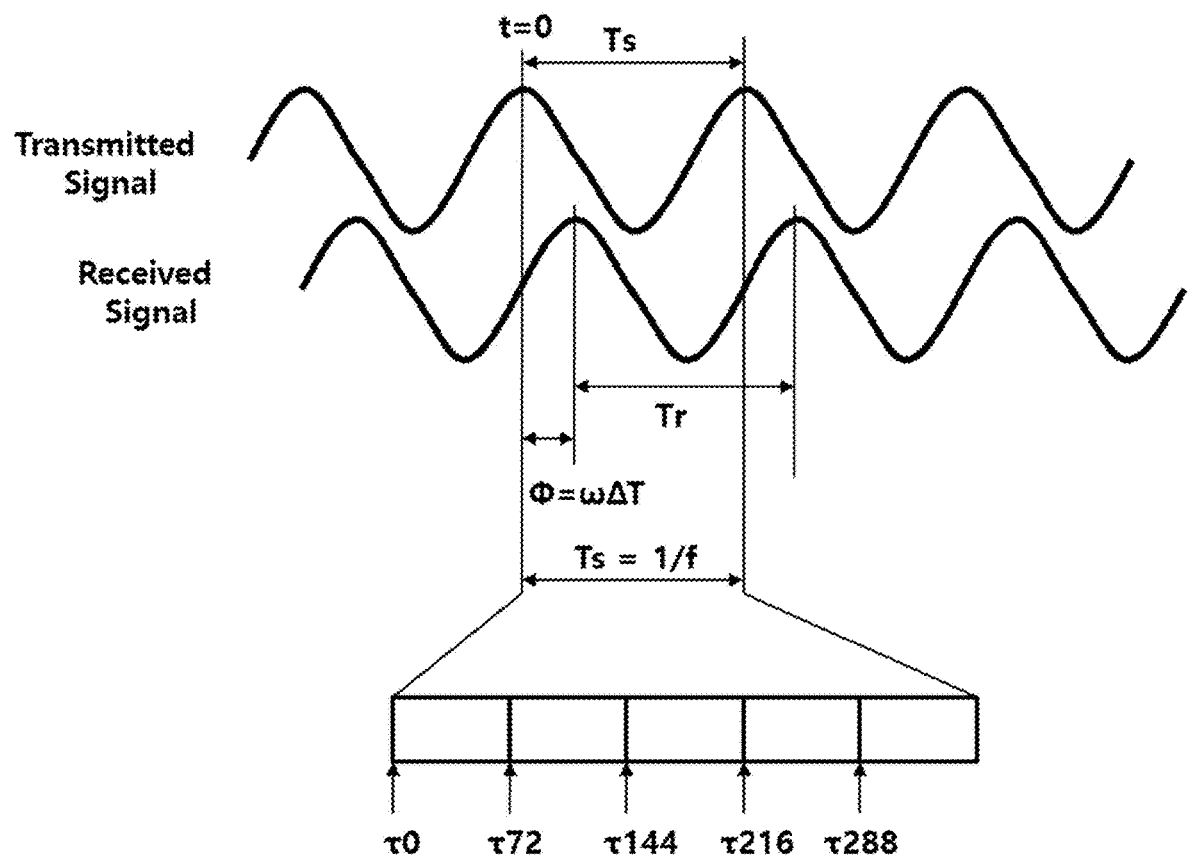
FIG. 2A illustrates an exemplary 5-tap positions for 5-phase correlations according to the present invention.

In FIG. 2A, it is shown that one period (360°) of transmitting signal is equally divided into 5 phases (360°/N=72° spacing), which are referred to delay taps positions. The 5 delay taps positions ($\tau 0, \tau 72, \tau 144, \tau 216, \tau 288$) represent phase positions at $\tau 0=0°$, $\tau 72=72°$, $\tau 144=144°$, $\tau 216=216°$, $\tau 288=288°$ of the transmitting signal, respectively. Each of 5-phase correlators performs the correlation between the received signal and the transmitting signal, each of which phase is 0, 72°, 144°, 216°, and 288° delayed.

Figure 2B:
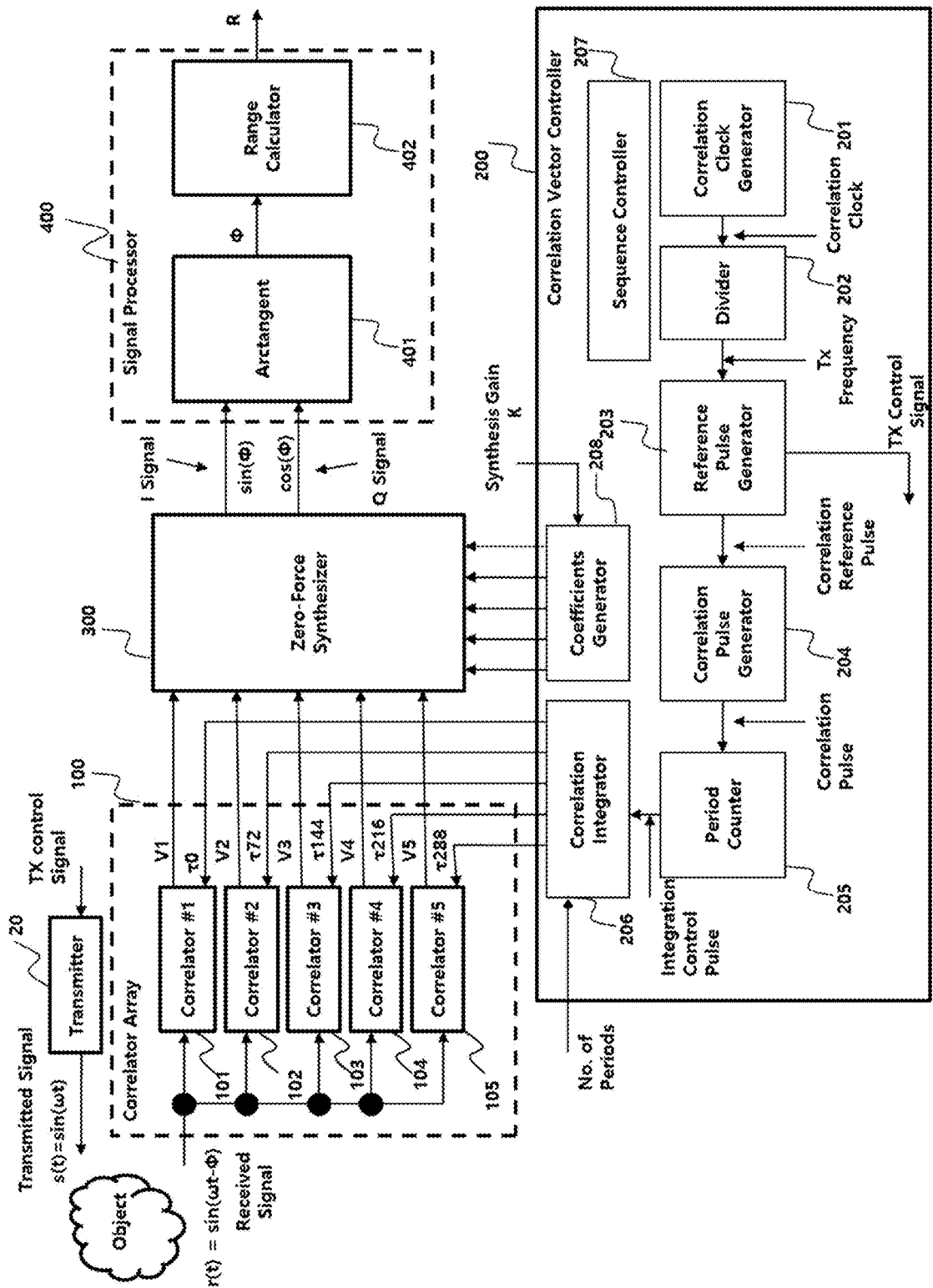
FIG. 2B shows an exemplary block diagram of 5-phase correlations vector synthesis ranging system according to the present invention.

An exemplary block diagram of TOF system employing 5-phase correlators is illustrated in FIG. 2B, where the correlator array (100) comprises 5 correlators (101~105), each of which correlation start time is 0°, 72°, 144°, 216°, and 288° delayed reference to the phase of the transmitting signal. The transmitter (20)transmits the signal s(t) that can be an RF wave, optical, laser, or ultrasonic signal. The correlators perform correlation with the received signal r(t) synchronized to the transmitting signal s(t). A correlation vector controller (200) generates delay taps control signals in controlling the correlator array (100). The correlation vector controller (200) also generates a transmitter control signal (TX control signal) and also provides the synthesis coefficients to the zero-force synthesizer (300).

The correlator #1, #2, #3, #4, and #5 that are driven by delay taps control signals from the correlation vector controller (200) start to correlate with the received signal at delayed positions $\tau 0$, $\tau 72$, $\tau 144, \tau 216$, and $\tau 288$, of the transmitting signal, respectively. Let the output of 5-phase correlators be $C(\tau 0)$, $C(\tau 72)$, $C(\tau 144)$, $C(\tau 216)$, and $C(\tau 288)$, respectively, then their sampled correlation vector signals $V_1, V_2, V_3, V_4,$ and $V_5$ can be obtained from EQ. (2), and are expressed as follows:

$$V1=C(\tau 0)=\sin(\emptyset+\tau 0)$$

$$V2=C(\tau 72)=\sin(\emptyset+\tau 72)$$

$$V3=C(\tau 144)=\sin(\emptyset+\tau 144)$$

$$V4=C(\tau 216)=\sin(\emptyset+\tau 216)$$

$$V5=C(\tau 288)=\sin(\emptyset+\tau 288) \quad \text{EQ. (4)}$$

where the amplitude constant is assumed to be 1 for simplicity.

By applying the sine addition formula, $\sin(a+b)=\sin(a)*\cos(b)+\cos(a)*\sin(b)$, EQ. (4) are rewritten as follows:

$$V1=\sin(\emptyset+\tau 0)=\sin(\emptyset)\cos(0)+\cos(\emptyset)\sin(0)=\sin(\emptyset)$$

$$V2=\sin(\emptyset+\tau 72)=\sin(\emptyset)\cos(72)+\cos(\emptyset)\sin(72)=0.309\sin(\emptyset)+0.951\cos(\emptyset)$$

$V3=\sin(\emptyset+\tau 144)=\sin(\emptyset)\cos(144)+\cos(\emptyset)\sin(144)=-0.809\sin(\emptyset)+0.588\cos(\emptyset)$ $V4=\sin(\emptyset+\tau 216)=\sin(\emptyset)\cos(216)+\cos(\emptyset)\sin(216)=-0.809\sin(\emptyset)-0.588\cos(\emptyset)$ $V5=\sin(\emptyset+\tau 288)=\sin(\emptyset)\cos(288)+\cos(\emptyset)\sin(288)=0.309\sin(\emptyset)-0.951\cos(\emptyset)$      EQ. (5)

EQ. (5) are first order linear equations having two unknown variables; in-phase ($\sin(\emptyset)$) and quadrature-phase ($\cos(\emptyset)$) signal components, which are also termed as two-phase orthogonal signals. Let (a1, a2, a3, a4, a5) be synthesis coefficients for the synthesis of $\sin(\emptyset)$ variable and (b1, b2, b3, b4, b5) be synthesis coefficients for the synthesis of $\cos(\emptyset)$ variable, the solution of EQ. (5) can be expressed as in EQ. (6) and EQ. (7).

$\sin(\emptyset)=(a1*V1)+(a2*V2)+(a3*V3)+(a4*V4)+(a5*V5)$     EQ. (6)

$\cos(\emptyset)=(b1*V1)+(b2*V2)+(b3*V3)+(b4*V4)+(b5*V5)$     EQ. (7)

The EQ. (6) and EQ. (7) imply that the two-phase orthogonal signals are synthesized from the 5-phase correlations vectors by $1^{st}$ order linear equations.

The synthesis coefficients in EQ. (6) and EQ. (7) have their values between −1.0~+1.0. Therefore EQ. (6) and EQ. (7) can be readily implemented by linear operational amplifiers (OP-Amps) circuits, of which input signals are 5-phase correlations vectors and their input gains are respective synthesis coefficients.

When the calculated synthesis coefficients are applied, EQ. (6) and EQ. (7) is rewritten as follows:

$\sin(\emptyset)=(0.4*V1)+(0.1236*V2)+(-0.3236*V3)+(-0.3236*V4)+(0.1236*V5)$ $\cos(\emptyset)=(0.0*V1)+(0.3804*V2)+(0.2352*V3)+(-0.2352*V4)+(-0.3804*V5)$ For arbitrary N-phase correlation, EQ. (6) and EQ. (7) of the zero-force synthesis can be generalized as follows:

$I=\sin(\emptyset)=K*[(a1*V1)+(a2*V2)+(a3=V3)+\ldots+(an*Vn)]$     EQ. (8)

$Q=\cos(\emptyset)=K*[(b1*V1)+(b2*V2)+(b3*V3)+\ldots+(bn*Vn)]$     EQ. (9)

In above equations, K denotes a synthesis gain that is determined by the ratio of amplitudes between the received signal and the signal to be synthesized. Referring to KR10-2067938 or US2021/0356299, the in-phase and quadrature-phase signals (or two-phase orthogonal signals) in EQ. (8) and EQ. (9) are shown to be an optimal synthesis in a sense of maximizing the orthogonality between the two-phase orthogonal signals by minimizing distortions induced in the received signal.

In FIG. 2B, the zero-force synthesizer (300) takes 5 correlations vectors from 5-phase correlators and synthesizes the in-phase and quadrature-phase signal components. Likewise, for N-phase case, $V_1, V_2, \ldots$, and $V_N$ correlation vectors are obtained from the correlators in correlator array (200) comprising N-phase correlators, where each of phase delay taps is sequentially phase delayed by 360°/N. The zero-force synthesizer (300) transforms the N correlations vectors into the two-phase orthogonal signals based on the EQ. (8) and EQ. (9), respectively.

The phase delay ($\emptyset$) between the transmitting and the received signal is calculated by taking arctangent of the ratio of in-phase to quadrature-phase signal as in EQ. (10). The phase delay ($\emptyset$) is further processed to determine the distance (R) between the transmitter and the object as expressed in EQ. (11), where c is the speed of light and f is the frequency of the transmitting signal.

$$\emptyset = \tan^{-1}\left[\frac{I}{Q}\right]$$     EQ. (10)

$$R = \frac{c}{2f} \times \frac{\emptyset}{2\pi}$$     EQ. (11)

The signal processor (400) block comprises the arctangent calculator (401) and the range calculator (402).

Figure 3A:
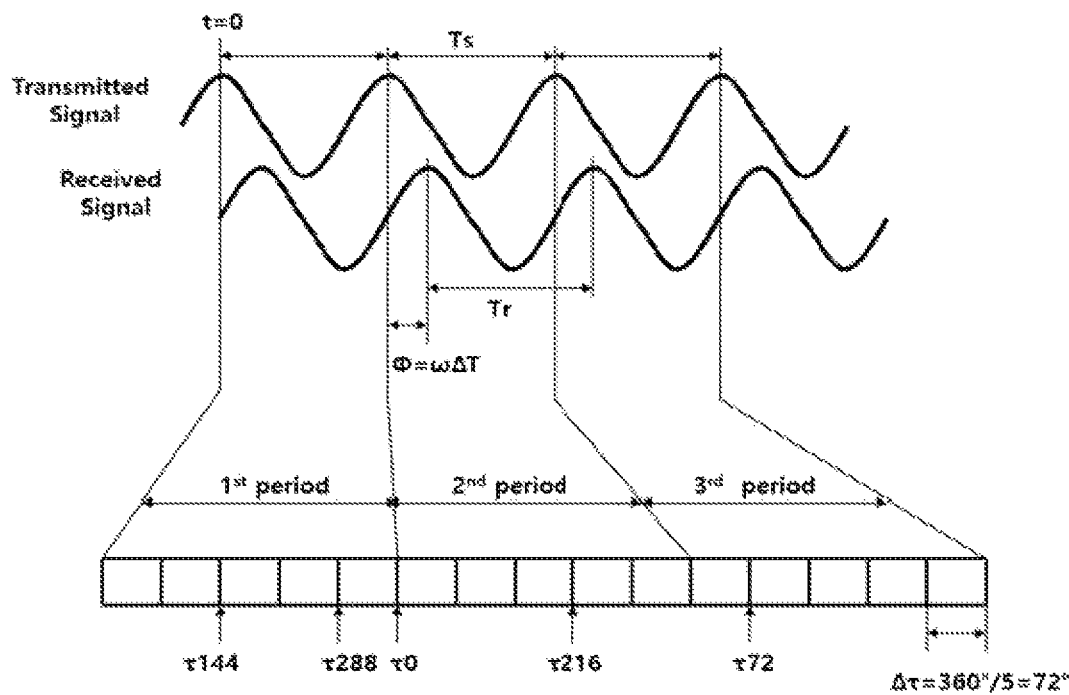
FIG. 3A illustrates an exemplary 5-tap positions for 5-phase correlations over multiple periods of the signal according to the present invention.

All of the delay taps positions are not necessarily in the same period of the signal, but can be distributed over multiple periods of the signal. As illustrated in FIG. 3A, the delay taps positions of τ144 and τ288 are in the first period of the signal, while the positions of τ0 and τ216 are in the $2^{nd}$ period, and the position of τ72 is in the $3^{rd}$ period of the signal. The correlation period, during which the correlation is performed by the correlator, also can be extended over multiple periods of signal as well.

Furthermore, delay taps positions, which are driven by the correlation vector generator (200), can be phase modulated in real time. For example, a certain phase offset, say ±2°, can be added to the delay taps positions so that τ(0+2), τ(72+2), τ(144+2), τ(216+2), and τ(288+2) can be used instead of previously τ0, τ72, τ144, τ216, and τ288 positions. Applying phase modulation to the delay taps positions implies in physical that the object of interest is scanned with a certain phase offset.

Figure 3B:
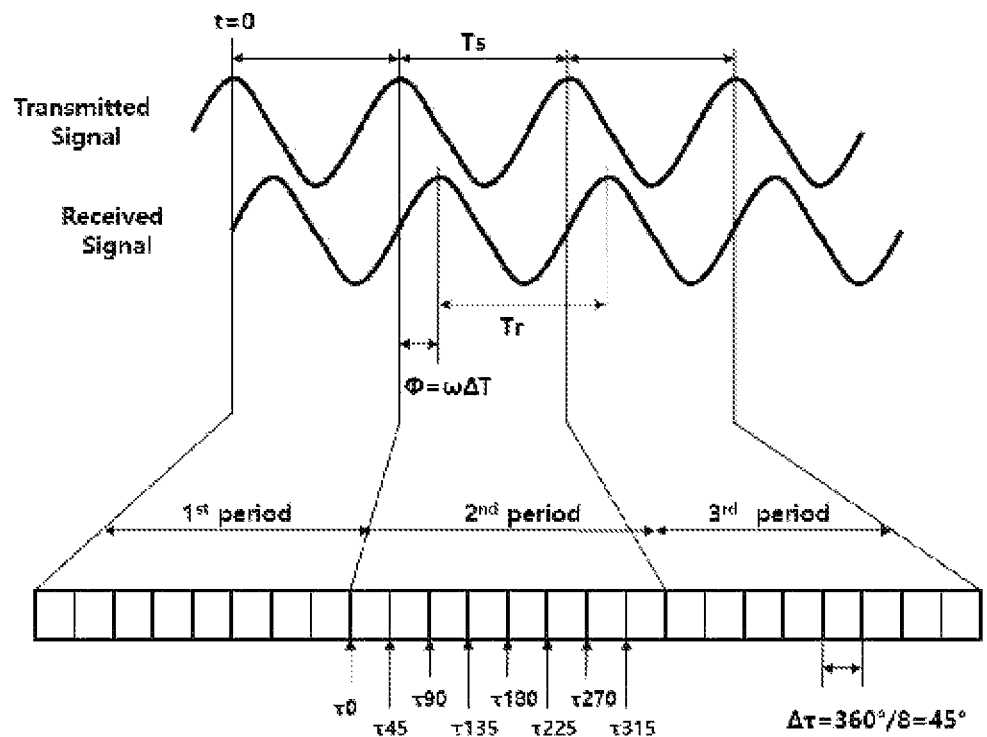
FIG. 3B illustrates an exemplary 8-tap positions for 8-phase correlations over multiple periods of the signal according to the present invention.

An even number of N-phase correlations can be used with delay taps positions that are likewise equally partitioned over one period of 360°, namely, 360°/N. For the case of exemplary 8-phase correlators, as shown in FIG. 3B, delay taps positions are τ0,τ45, τ90, τ135,τ180 τ225, τ270, and τ315. It is noted here that when N is an even number, correlations vectors at some of delay taps positions are not entirely independent due to the periodic property of the received signal, which results in an inferior performance. Therefore, delay taps positions that are equally partitioned by odd N number over one period of 360° is preferred.

Figure 3C:
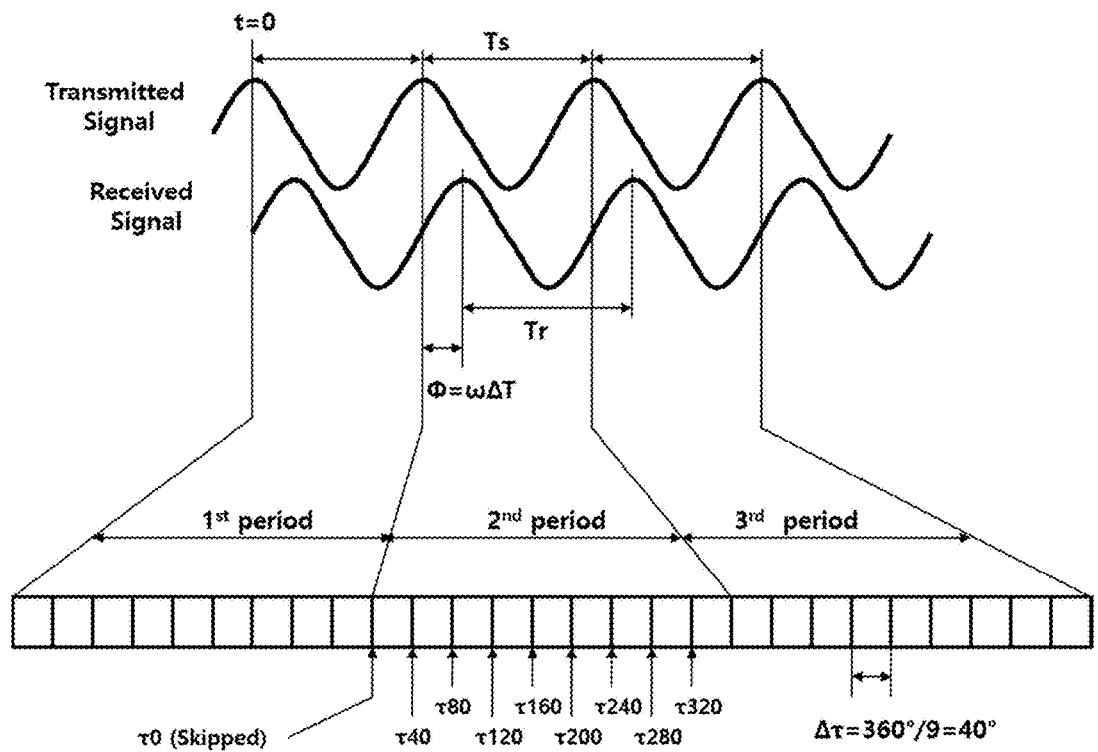
FIG. 3C illustrates an exemplary 9-tap positions, but using only 8-phase correlations over multiple periods of the signal according to the present invention.

Among an odd number N delay taps positions, however, even number, which is less than N, delay taps positions can be selected. For example, in FIG. 3C, one period of the signal is equally partitioned into 9 delay taps positions τ0,τ40, τ80, τ120,τ160 τ200, τ240,τ280, and τ320, however, only 8 delay taps positions are active by skipping τ0 position. In this case, compared to the 8-phase correlators in FIG. 3B, the distance resolution is approximately doubled. As the number of delay taps positions increases, Δτ gets smaller that results in a finer resolution in correlation vectors. The correlation vectors from delay taps positions that are equally partitioned by an odd number over one period provide the maximum achievable results as disclosed in KR10-2067938 and US2021/0356299.

The conventional method of 4 correlators at 0°, 90°,180°, 270° positions is regarded as the case of N=4 (4-phase) correlations. However, if 4 correlations vectors are chosen at delay taps positions (τ72,τ144,τ216,τ288) among 5 equally partitioned tap positions (τ0,τ72,τ144,τ216,τ288), then much improved performance is expected after the zero-force synthesis compared with that of the conventional 4-phase correlations.

Figure 3D:
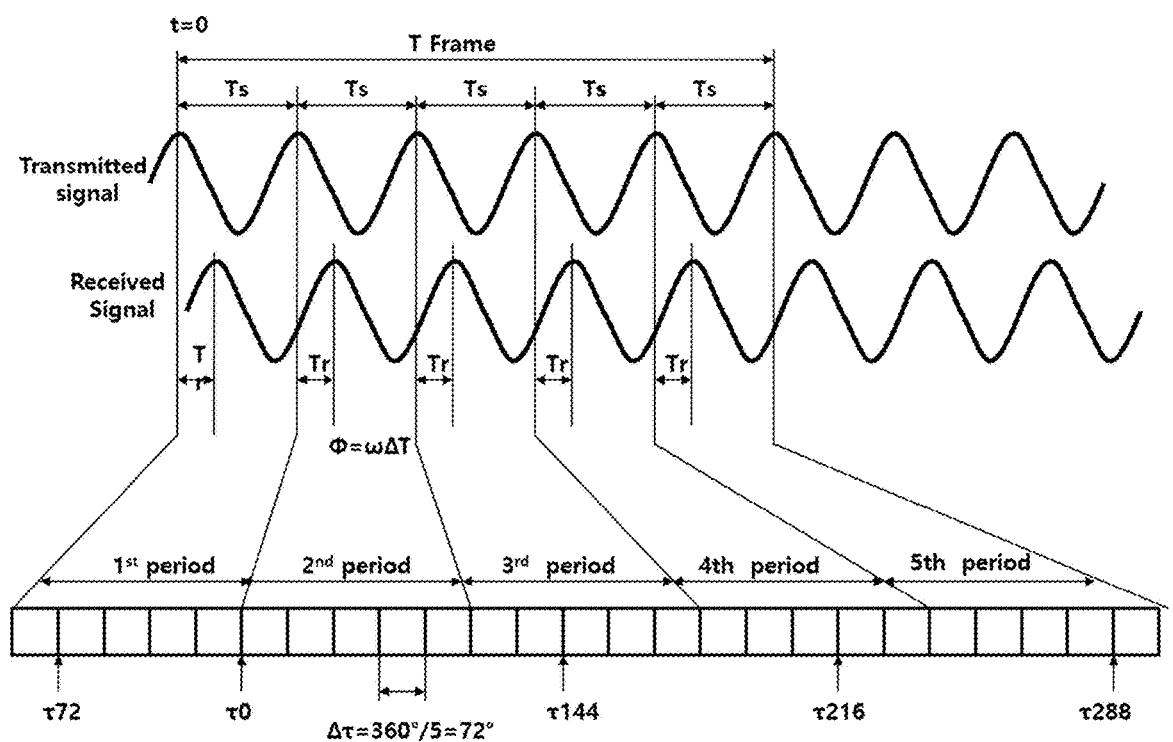
FIG. 3D illustrates another example of FIG. 3A, 5-tap positions of 5-phase correlations over multiple periods of the signal according to the present invention.

In FIG. 3D, it is shown that each correlation vector is obtained in each period of the transmitting signal for 5-phase correlations such that correlation vector at τ72, τ0, τ144, τ216, and τ288 position is obtained in the $1^{st}$, $2^{nd}$, $3^{rd}$, $4^{th}$, and $5^{th}$ period, respectively. In practical applications, as the voltage level of correlation vector in one cycle would be small, the correlation vector accumulated over multiple cycles at equivalent positions is preferred to improve the performance.

In what follows, synchronization aspects between the transmitter and the receiver in realization of multi-phase correlator and its related control logics are disclosed.

Correlation Vector Controller

As described in the foregoing sections, when the transmitting signal at the transmitter (20) is a pulse signal, the multi-phase correlator at the receiver needs to be aligned by delay positions partitioned by an odd N number over one period of the transmitter signal, where N is greater than or equal to 3. The modulated period of the transmitting signal has to maintain 50% duty cycle.

As an exemplary realization in FIG. 2B, the correlation vector controller (200) comprises a correlation clock generator (201), a clock divider (202) to generate a transmission frequency, a reference pulse generator (203) to generate a transmission (TX) control signal and a reference pulse for the TOF system, a correlation pulse generator (204), and a period counter (205) to control integration periods. The correlation vector controller (200) also includes a correlation integrator (206) that generates and asserts delay taps control signals to the correlator array (100). A sequence controller (207) for controlling frame sequences of delay taps control signals and a coefficients generator (208) for the zero-force synthesis are also included in the correlation vector controller (200).

Figure 4:
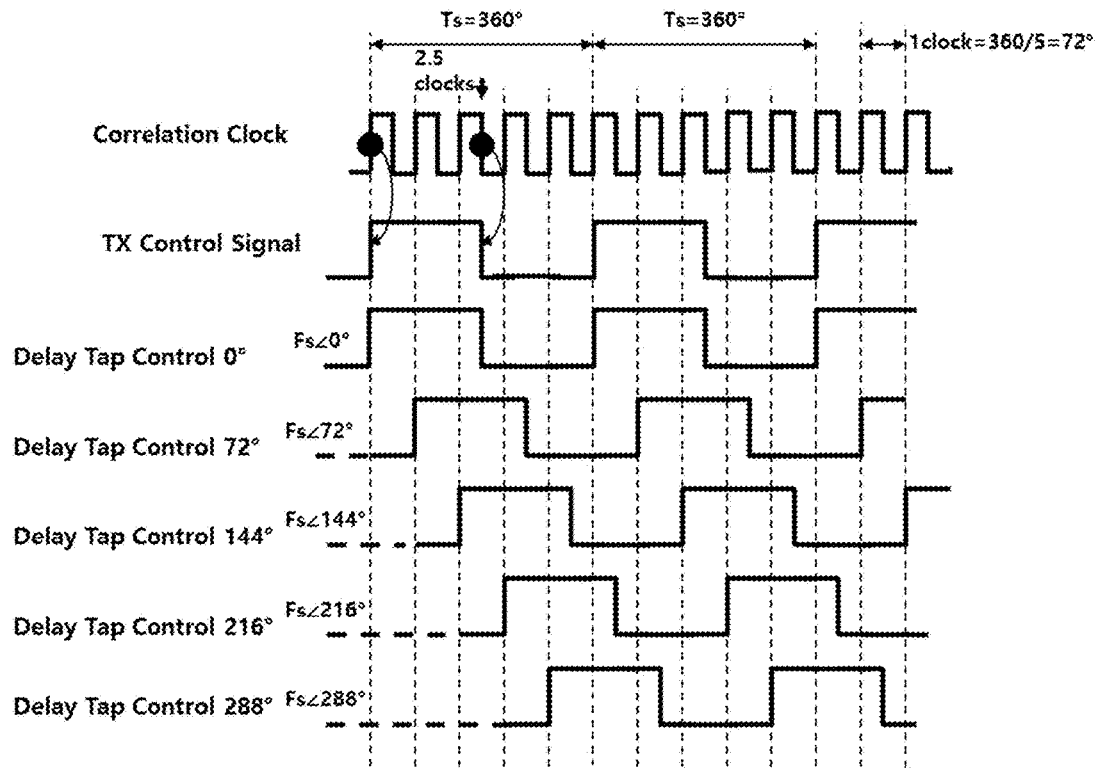
FIG. 4 illustrates an exemplary correlation clock, TX control signal, and delay taps control signals synchronized to the correlation clock for the case of 5-tap positions of 5-phase correlations.

In FIG. 4, reference to the correlation clock, phase relationship between the TX control signal and the delay taps control signals is shown for the case of 5-phase correlators (N=5). The frequency of the correlation clock is exactly 5 times of that of transmission signal. Therefore, the TX control signal is generated at the reference pulse generator (203) after dividing the correlation clock by 5 at the clock divider (202).

Referring to FIG. 4, the TX control signal starts at the rising (or falling) edge of the correlation clock, and stops at the falling (or rising) edge after exactly 2.5 clocks. Having 5 correlation clock cycles, the delay taps control signals, synchronized to the correlation clock, also start at the rising (or falling) and stop at the falling (or rising) edge after 2.5 clocks of correlation clock.

When N is an odd number greater than or equal to 3, the state transition of TX control signal and delay taps signals at every N/2 clocks of the correlation clock necessitates a half clock driving. The half clock driving can be avoided if the frequency of correlation clock is set to p*N (p is an even number greater than or equal to 2) times of the transmission frequency, however, still it needs extra logic circuits in order to maintain 50% duty cycle of the TX control signal and delay taps control signals.

Therefore, it is assumed in the present invention that the frequency of correlation clock is p*N (p is an odd number greater than or equal to 1) times of the TX control signal, and accordingly each of delay taps control signals is delayed by p clock cycles of the correlation clock.

The 50% of duty of the TX control signal can be generated by a half clock shifter (HCS) having dual edge or a full clock shifter (FCS) having dual pulses. In what follows, p=1 (each of delay taps control signals is delayed by 1 correlation clock) is assumed.

Half Clock Shifter (HCS)

Figure 5A:
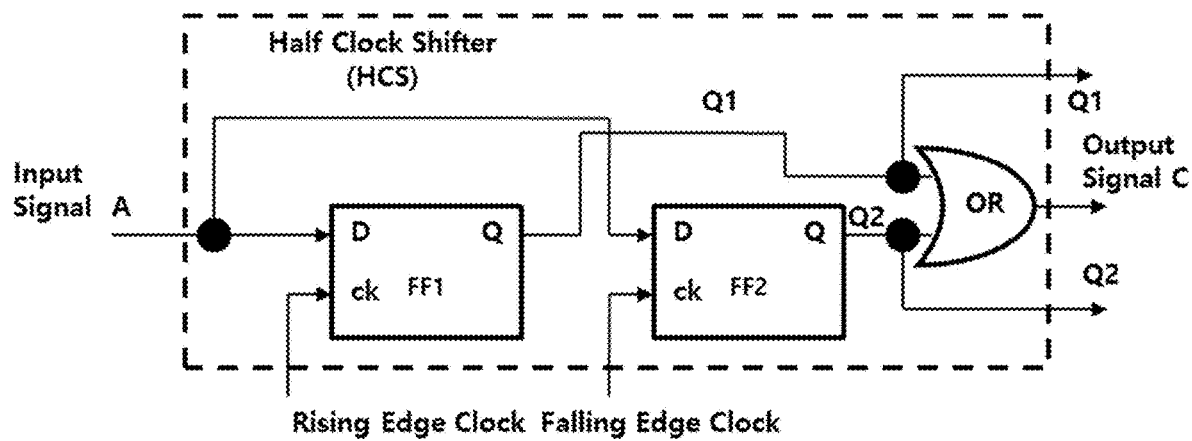
FIG. 5A shows an exemplary circuit diagram in generation of a dual edge half clock shifter (HCS) having both rising-edge and falling-edge according to the present invention.
Figure 5B:
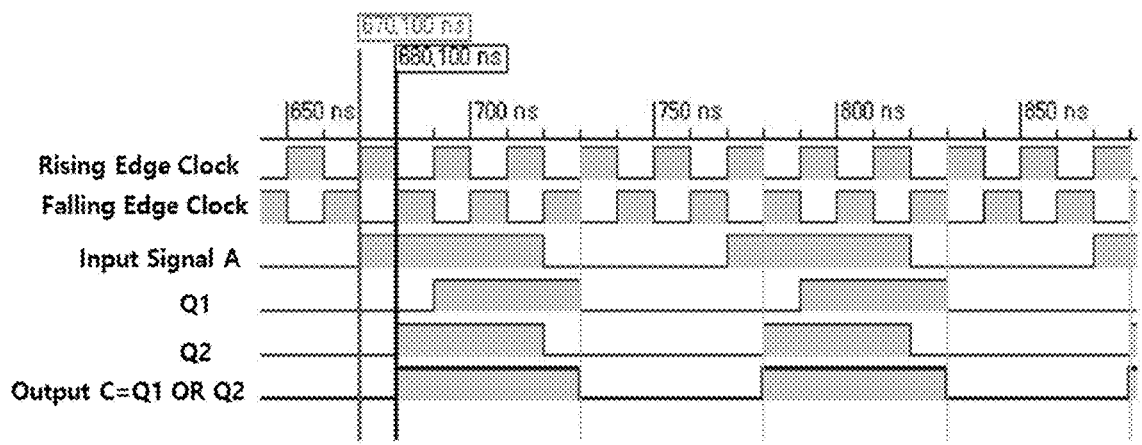
FIG. 5B draws signal waveforms of input and output clocks in the HCS circuits of FIG. 5A.

In FIG. 5A and FIG. 5B, an exemplary circuit diagram of dual edge half clock shifter (HCS) and its operational clocking waveforms for N=5 are drawn, respectively. The dual-edge half clock shifter is applied to generate the reference pulse generator (203), the correlation pulse generator (204), and the correlation integrator (206).

The HCS comprises two D flip flops (FF); D-FF1 and D-FF2, where D-FF1 is triggered by the rising edge and D-FF2 is triggered by the falling edge of the correlation clock.

Referring to FIG. 5B, input signal A has its period of 5 correlation clock cycles (N=5), and changes the state of the output signal C at 2.5 clocks of correlation clock, changing the state either at the rising/falling or the falling/rising edge of the correlation clock.

The Q1 (output of D-FF1) and Q2 (output of D-FF2) is an asymmetric signal, however, the OR gate output signal C, synchronized to the rising and falling edge of the correlation clock, is a symmetric signal having 50% duty cycle. The output signal C is a half clock (0.5 clock) shifted from the input signal A that is 36° for N=5 case, Full Clock Shifter (FCS)

Figure 6A:
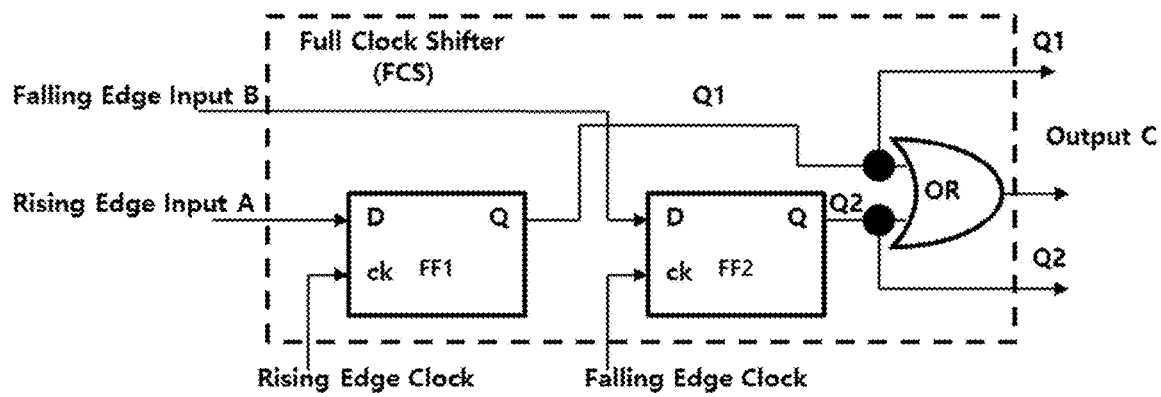
FIG. 6A shows an exemplary circuit diagram in generation of a full clock shifter (FCS) according to the present invention.
Figure 6B:
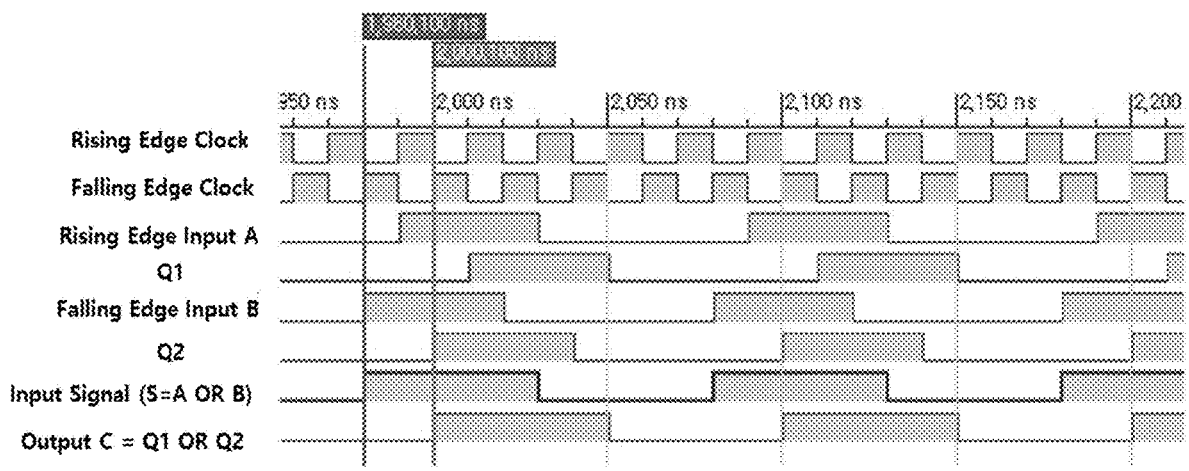
FIG. 6B draws signal waveforms of input and output clocks in the FCS circuits of FIG. 6A.

In FIG. 6A and FIG. 6B, an exemplary circuit diagram of the full clock shifter (FCS) and its operational clocking waveforms for N=5 are drawn, respectively. The full clock shifter is applied to generate the reference pulse generator (203), the correlation pulse generator (204), and the correlation integrator (206).

As was in HCS, D-FF1 is triggered by the rising edge and D-FF2 is triggered by the falling edge of the correlation clock, but the rising edge input A is connected to D-FF1 and the falling edge input B is connected to D-FF2. The input A and B can be generated from the output Q1 and Q2 of the HCS circuits.

Referring to FIG. 6B, the output Q1 and Q2 is 1 clock shifted from the input A and B, respectively. The resultant output signal C (Q1 OR Q2) is 1 clock shifted from the input signal S (A OR B). In what follows, an exemplary realization of the reference pulse generator (203) is presented using the HCS and the FCS.

Dual Edge TX Pulse Generator

Figure 7A:
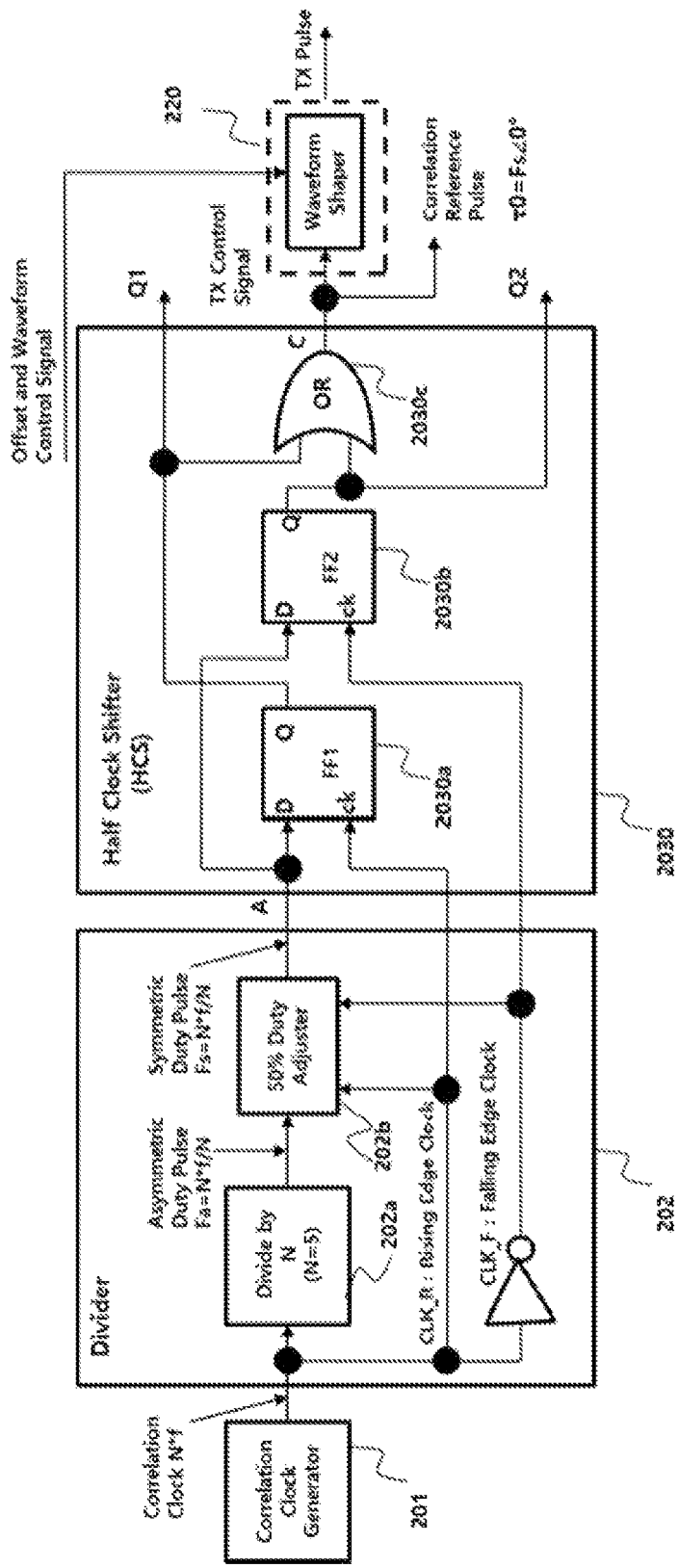
FIG. 7A draws an exemplary circuit diagram in generation of dual edge TX pulse employing the HCS according to the present invention.
Figure 7B:
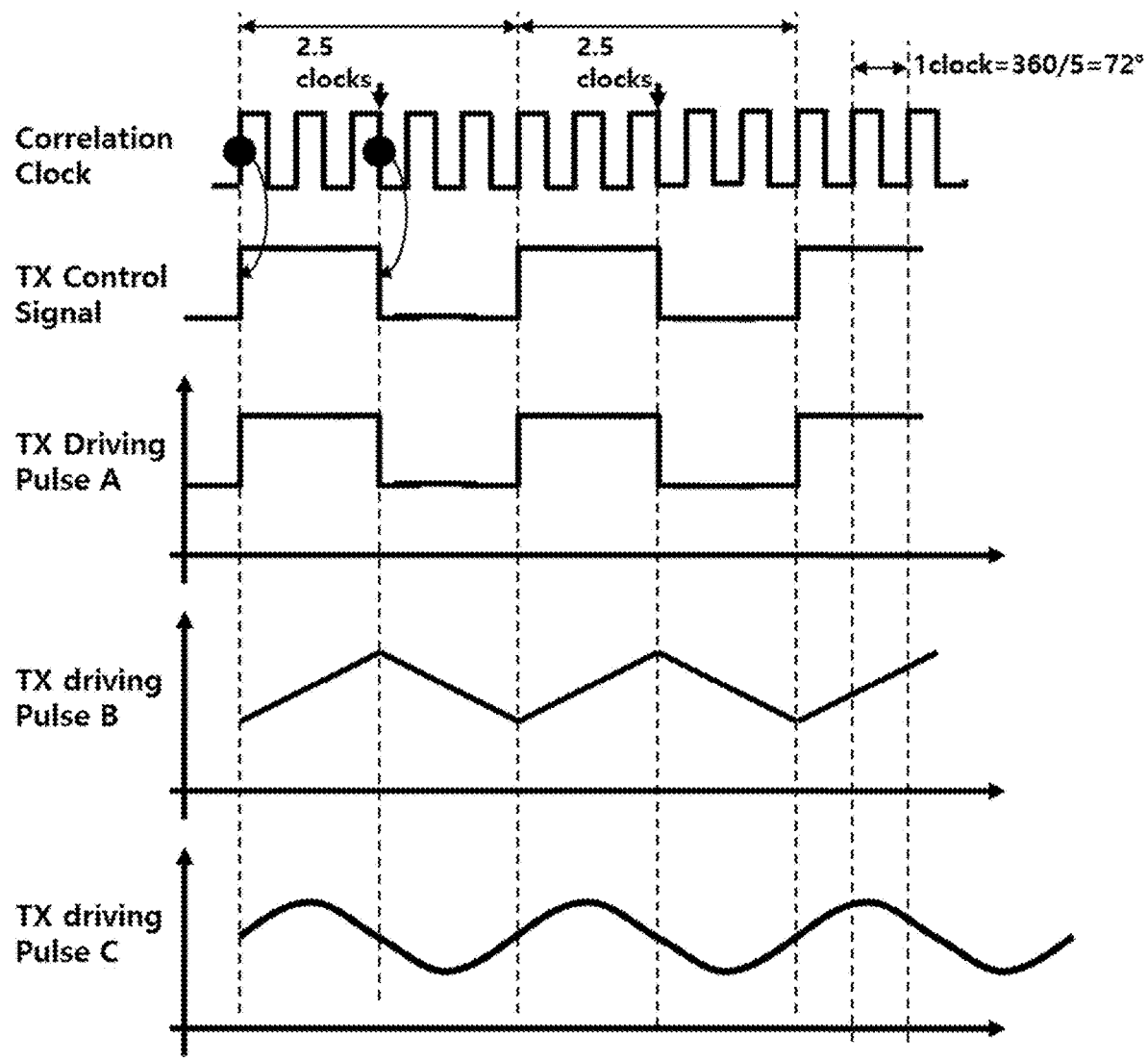
FIG. 7B draws signal waveforms of input and output clocks of the dual edge TX pulse generator in FIG. 7A.

In FIG. 7A, an exemplary circuit diagram of the dual edge TX pulse generator utilizing the HCS illustrated in FIG. 5A. FIG. 7B illustrates the waveforms of signals in FIG. 7A.

The correlation clock generator (201) generates a clock having its frequency N*f, where f is the transmission frequency and N is an odd number greater than or equal to 3. The clock divider (202) is to divide the frequency of the correlation clock such that Fa=N*f/N, where Fa has the same frequency as that of the transmission frequency, but its duty cycle may not be 50%. Thereby a 50% duty adjuster (202b) is necessary to make a symmetric 50% duty cycle signal. The resultant output signal of the clock divider (202) has its frequency (Fs) that is the same as that of transmission frequency, and has both rising and falling edges.

The HCS (2030) takes the output signal of the clock divider (202) and generates the correlation reference pulse (or TX control signal) which is a half clock shifted from Fs. The TX control signal can be converted to the various transmittal waveforms like square wave, trapezoidal, or sinusoidal through a waveform shaper (220) as illustrated in FIG. 7B. The DC offsets can be also added to the transmittal waveform at the waveform shaper (220). Therefore, the waveform, frequency, or DC offsets of the transmittal signal are conveniently selected in practical applications.

Figure 7C:
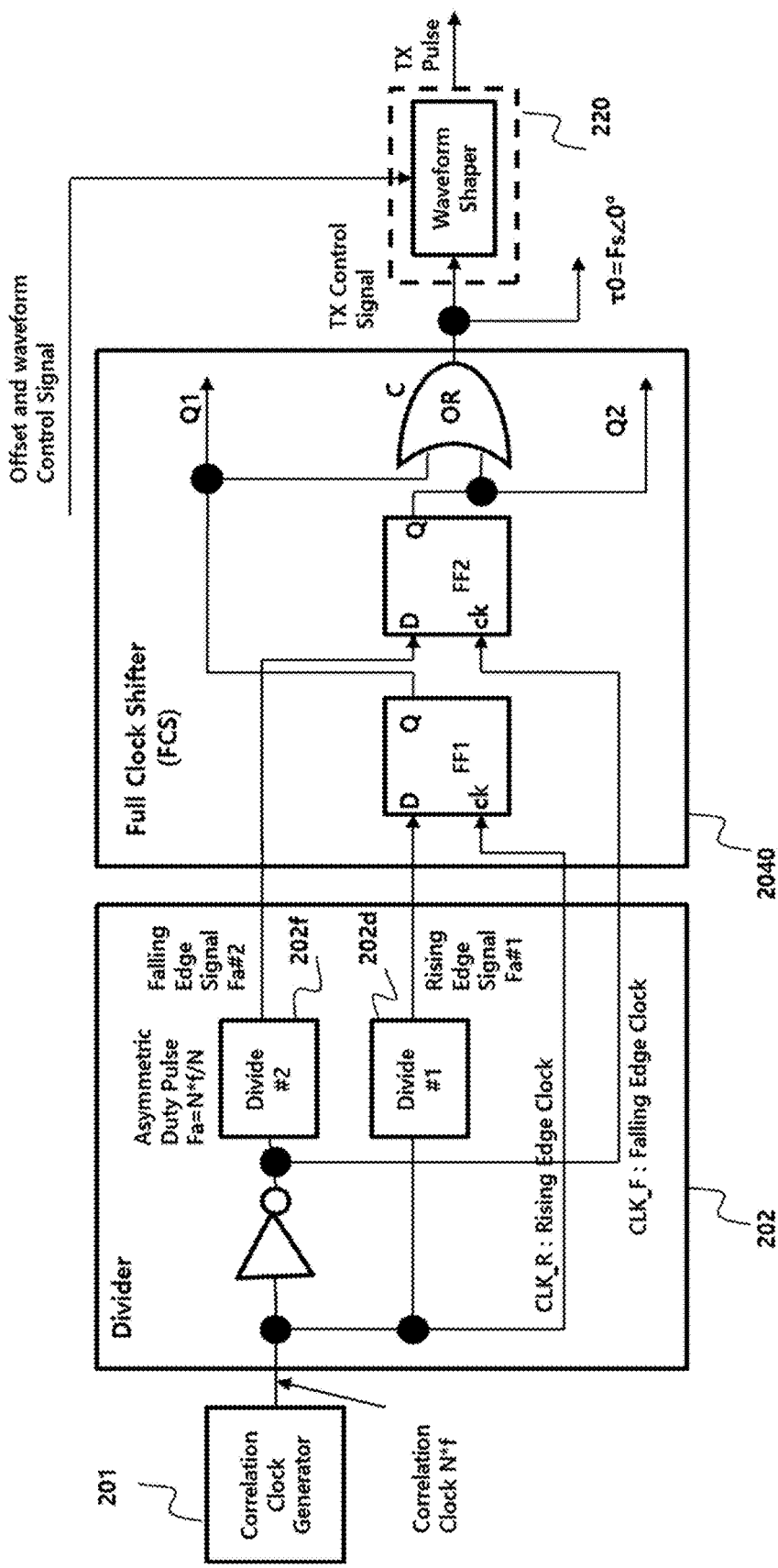
FIG. 7C draws another exemplary circuit diagram in generation of dual edge TX pulse employing the FCS according to the present invention.

In FIG. 7C, another exemplary circuit diagram of the reference clock generator is shown that utilizes the FCS (2040) in FIG. 6A, where Fa #1 (rising edge signal) and Fa #2 (falling edge signal) is generated from the divider #1 and divider #2, respectively. The rising edge Fa #1 signal and falling edge Fa #2 signal have the same frequency, but the phase is a half clock shifted. The FCS takes Fa #1 and Fa #2 and generates the dual edge TX pulse.

Dual Edge Correlation Pulse Generator

Figure 8:
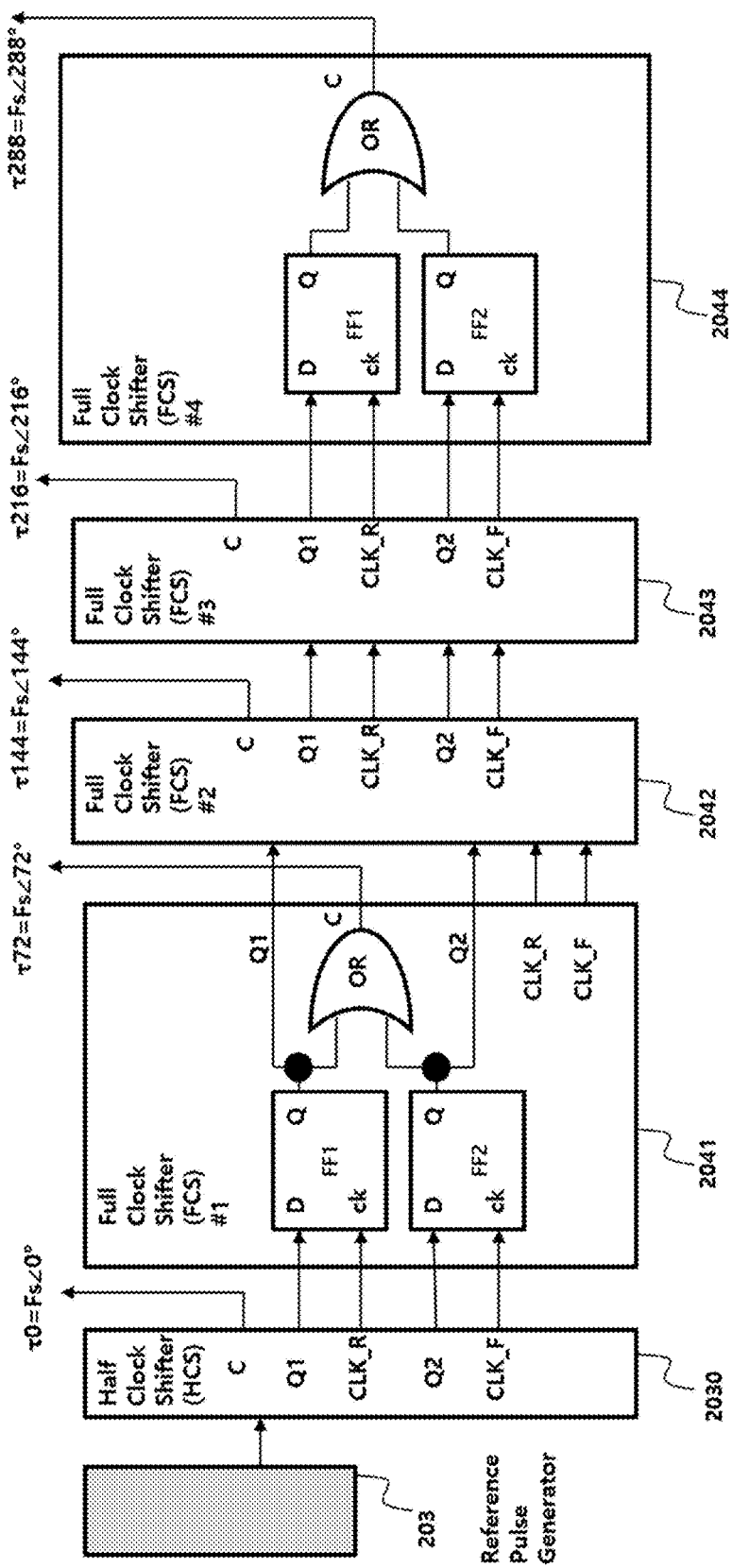
FIG. 8 draws an exemplary circuit diagram of dual edge correlation pulse generator when 5-phase correlations are considered according to the present invention.

In FIG. 8, an exemplary circuit diagram of the dual edge correlation pulse generator (204) is drawn for N=5 case. For N-phase correlations, N correlation pulses are generated, and each of which phase is 360°/N shifted.

Referring to FIG. 8, the reference pulse generator (203) is connected to the HCS (2030), and the output of HCS is connected to the FCS #1 (2041), FCS #2 (2042), FCS #3 (2043), and FCS #4 (2044). The subsequently connected FCSs generate sequentially 360°/N shifted correlation pulses. The correlation pulse at $\tau_{72}$, $\tau_{14}$, $\tau_{216}$, and $\tau_{288}$ tap position is generated from the FCS #1, FCS #2, FCS #3, and FCS #4, respectively.

Dual Edge Correlation Integrator

The correlation integrator (206) controls the integration time of the correlator based on the correlation pulse. Typically, the integration is performed throughout multiple periods as the received signal from the reflection is very low.

Figure 9A:
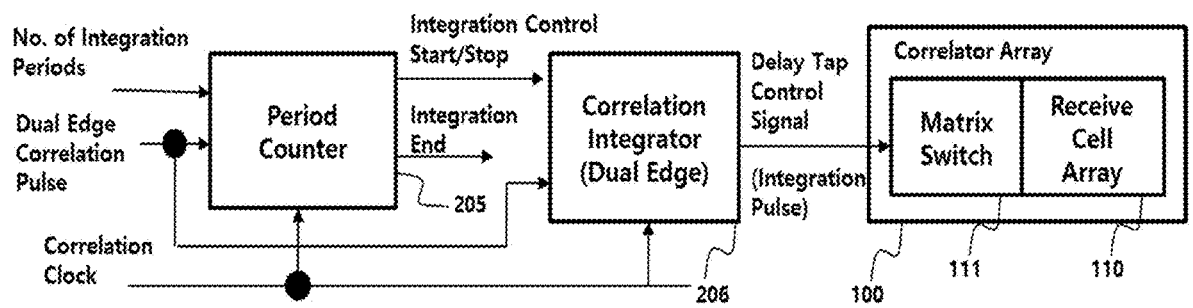
FIG. 9A draws an exemplary block diagram of applying the dual edge correlation integrator to the correlator array according to the present invention.

FIG. 9A illustrates an exemplary application of the dual edge correlation integrator (206), where a period counter (205) controls the integration period of the dual edge correlation integrator (206). The correlator array (100) comprises a receive cell array (110) and a matrix switch (111). The matrix switch (111) selects the receiver cell array to be correlated. Referring to FIG. 9A, the period counter (205) takes the number of integration periods that is pre-programmed by the user and counts the number of dual edge correlation pulses generated from the correlation pulse generator (204) in synchronization to the correlation clock. When a counted number at the period counter (205) is less than the number of integration periods, a start correlation signal is sent through the integration control signal that results in start of integration at every rising (or falling) edge of the correlation pulse. When a counted number is equal to the number of integration periods, a stop correlation signal is sent to the correlation integrator (206) that results in stop of integration.

Figure 9B:
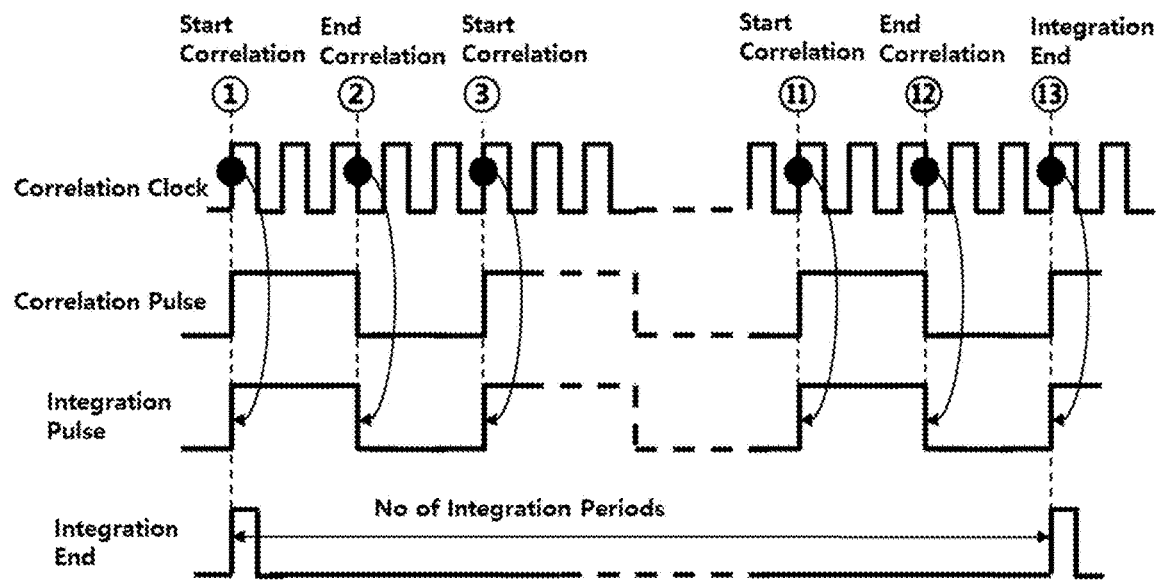
FIG. 9B draws signal waveforms of the correlation clock, correlation pulse, integration pulse, and integration start/end signals in FIG. 9A according to the present invention.
Figure 10A:
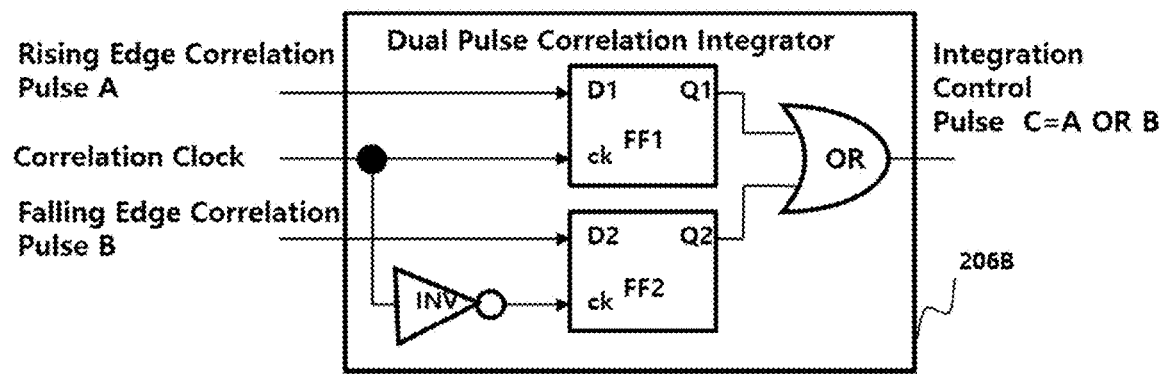
FIG. 10A draws an exemplary circuit diagram a dual pulse correlation integrator according to the present invention.
Figure 10B:
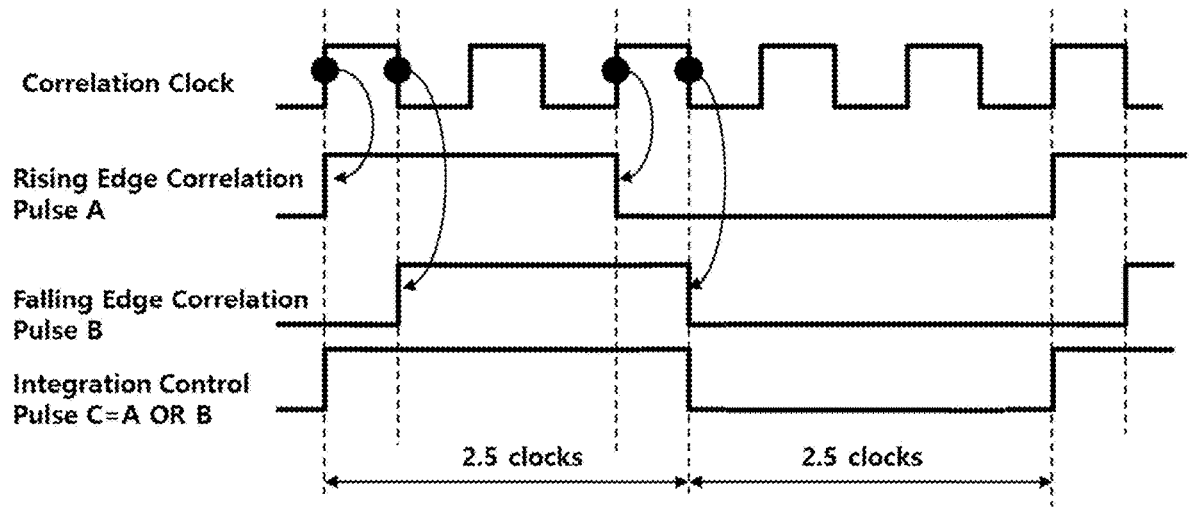
FIG. 10B draws signal waveforms of the dual pulse correlation integrator in FIG. 10A.

The dual edge correlation integrator (206) generates a delay tap control signal (or integration pulse) for each correlator at every period, according to which each correlator starts integration at the rising (or falling) and stops at the falling (or rising) of the correlation clock. The integration pulse enables to control the receive cell array (110) accurately that is selected by the matrix switch (101) in the correlator array. The total integration time during which the correlator array is exposed to the received signal becomes the period of transmitting signal multiplied by the number of integration periods. FIG. 9B illustrates exemplary operational clocking waveforms for N=5 case in FIG. 9A In FIG. 10A, as another exemplary of the correlation integrator, a dual pulse correlation integrator is shown that has a dual pulse as the input signal. The dual pulse correlation integrator (206B) is realized by the full clock shifter (FCS) in FIG. 6A except the addition of an inverter to the D-FF2 for the purpose of providing a falling edge of the correlation clock. Therefore, differently from the dual edge correlation integrator (206), the two asymmetric input signals, pulse A of the rising edge correlation and pulse B of the falling edge correlation, are independently provided. As explained in the FCS of FIG. 6A, the start and end of the integration is triggered by the rising edge of the correlation clock and by the falling edge the correlation clock after 2.5 clocks, respectively. FIG. 10B illustrates exemplary operational clocking waveforms for N=5 case in FIG. 10A.

Frame Control Method of the Correlation Receiver

One set of complete N number of correlation vectors is regarded as one frame when N-phase correlations are considered, from which phase delay or ranging information is processed.

Figure 11A:
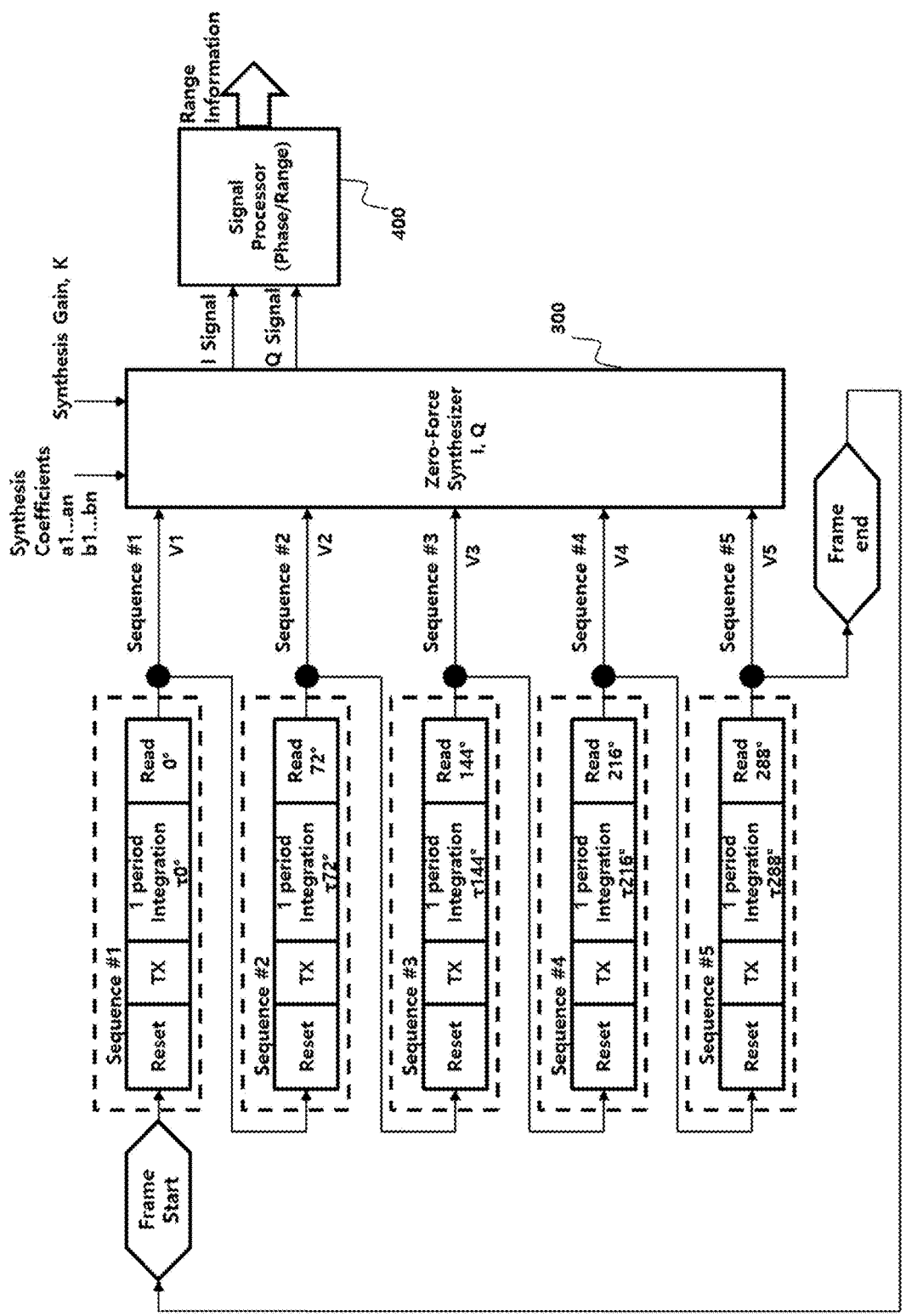
FIG. 11A illustrates an exemplary frame control method in generation of 5-phase correlation vectors according to the present invention.

FIG. 11A illustrates an exemplary frame control method for N=5 in serial, where there are N=5 sequences corresponding to 5 delay taps positions, $\tau_0$, $\tau_{72}$, $\tau_{14}$, $\tau_{216}$, and $\tau_{288}$. By executing the sequence #1, correlation vector V1 is obtained by integration of correlated values between the received signal and $\tau_0$ delayed version of the transmitting signal. Likewise, V2, V3, V4, and V5 is obtained by executing the sequence #2, #3, #4, and #5, respectively.

Figure 11B:
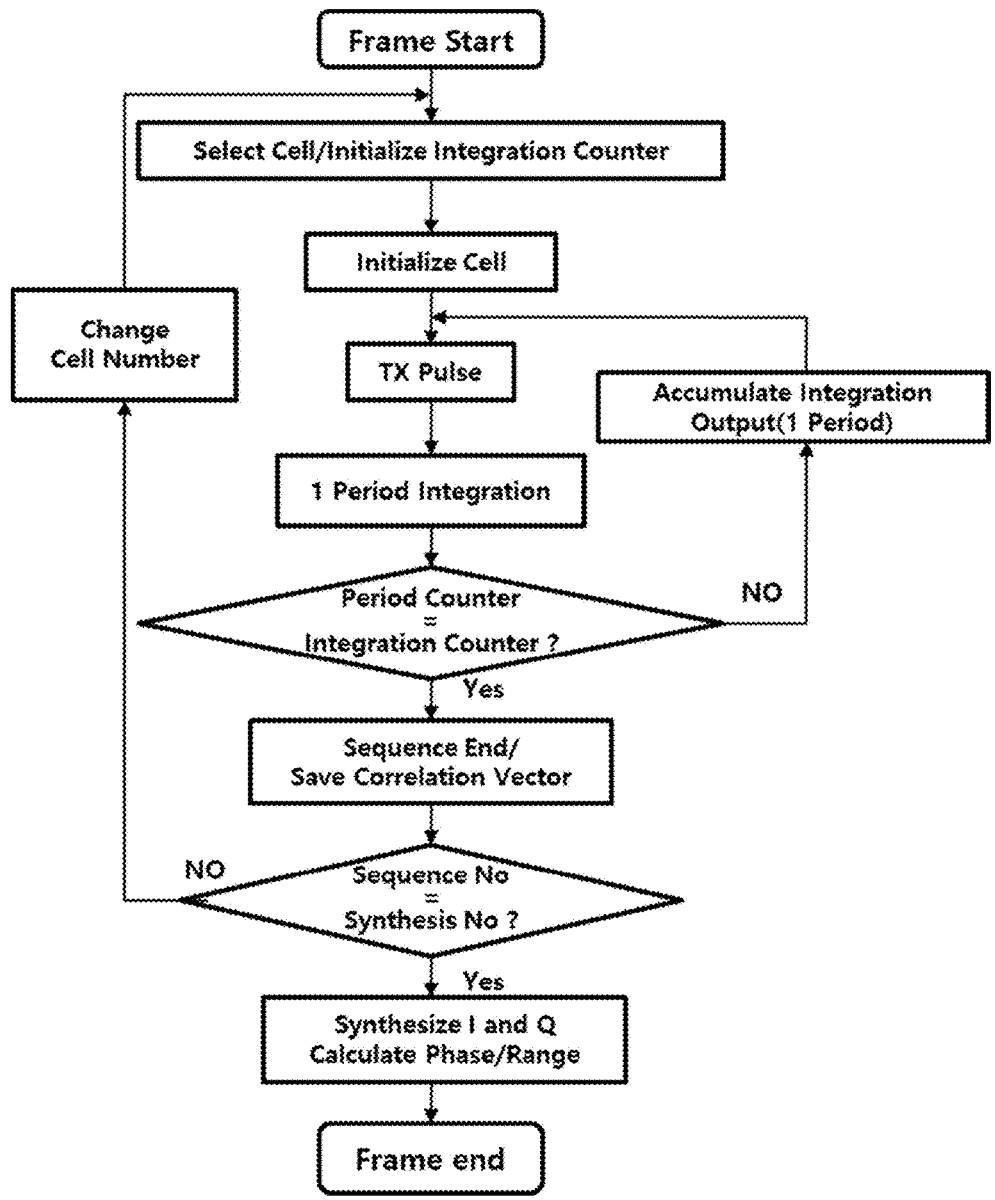
FIG. 11B draws an operational flowchart of the frame control method in FIG. 11A according to the present invention.

The obtained correlation values, V1, V2, V3, V4, and V5, are fed into the zero-force synthesizer (300) to synthesize the two-phase orthogonal signals of I and Q. The I and Q signals are processed by the signal processor (400) to calculate the phase delay and range information. The flowchart of the serial frame control process in FIG. 11A is drawn in FIG. 11B.

Figure 11C:
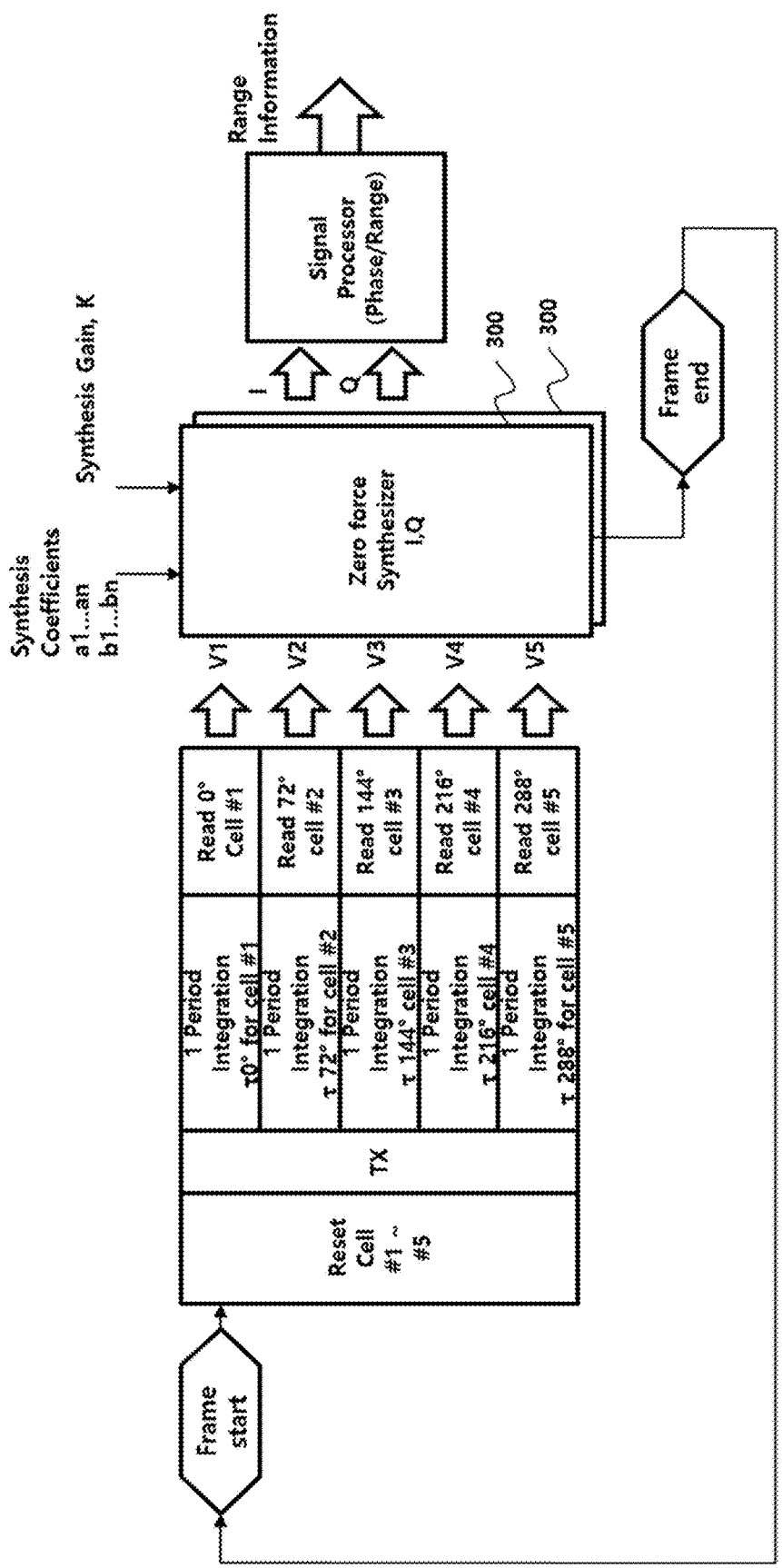
FIG. 11C draws another exemplary frame control method in generation of 5-phase correlation vectors according to the present invention.

In general, the processing time increases as the number N increases, which may result in a slow response of obtaining range information from the moving object. To address this issue, more than one correlator can be employed so that more than one correlation vector is obtained in one period of the signal. In FIG. 11C, an exemplary block diagram of employing multiple correlators and multiple zero-force synthesizers (300) is drawn for N=5, where 5 cells are used to simultaneously perform 5 correlations in one period of the signal.

Figure 11D:
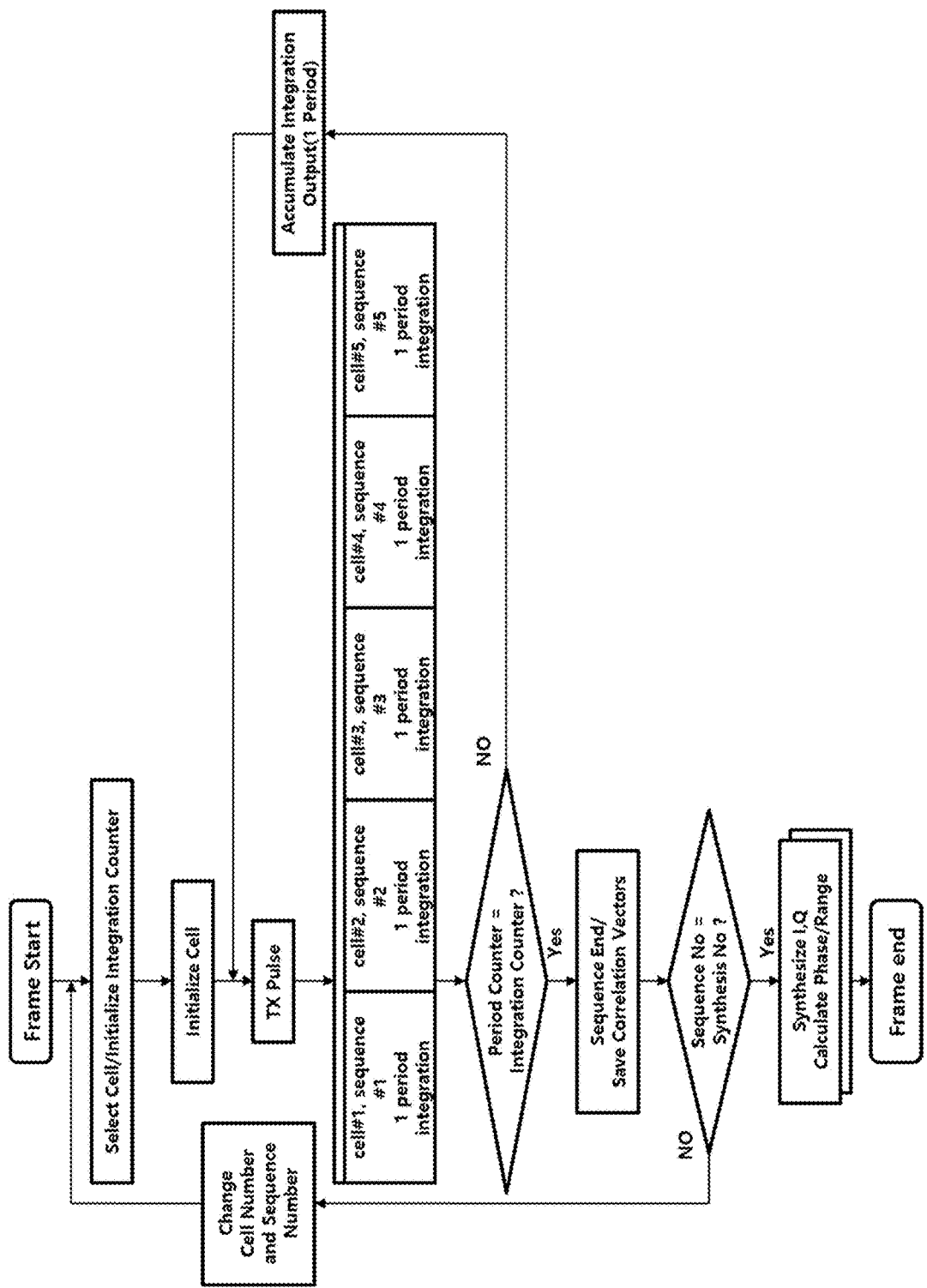
FIG. 11D draws an operational flowchart of the frame control method in FIG. 11C according to the present invention.

In FIG. 11D, a flowchart of the frame control process employing multiple correlators is drawn according to the present invention. In practical applications, a dual edge correlation integrator or a dual pulse correlation integrator can be used. Moreover, more than one zero-force synthesizer can be employed to improve the processing time especially in ranging of the moving objects.

Zero-Force Synthesizer

Figure 12A:
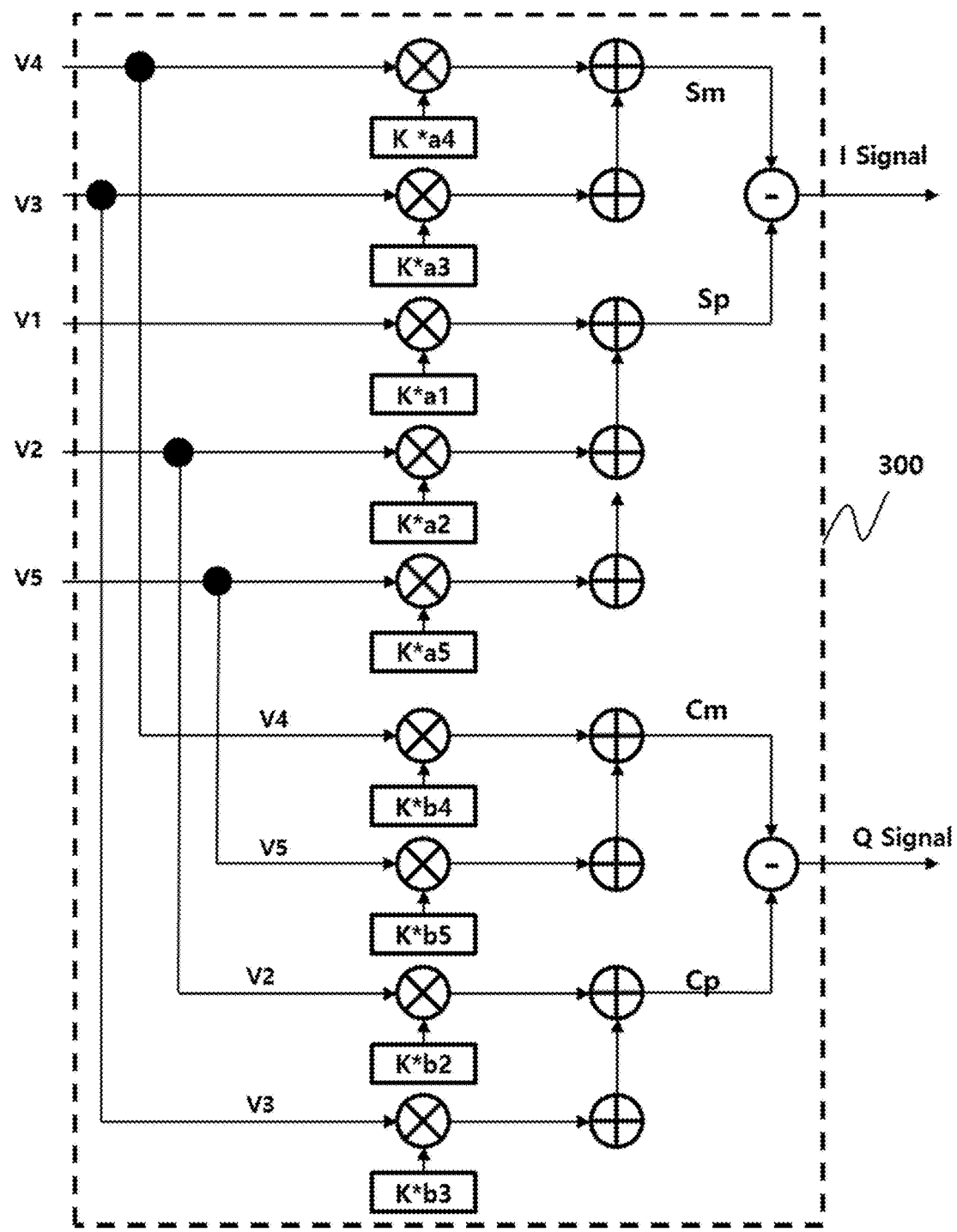
FIG. 12A draws an exemplary arithmetic process of the zero-force synthesis for N=5 case according to the present invention.

The zero-force synthesizer (300) transforms N correlation vectors into two-phase orthogonal signals based on the EQ. (8) and EQ. (9), which can be implemented either in software or hardware. In FIG. 12A, the arithmetic process of the zero-force synthesis for N=5 case is drawn, where V1, V2, V3, V4, and V5 correlation vectors are converted into I and Q signals based on the synthesis coefficients a1, a2, ... , a5 and b1, b2, ... , b5, respectively. The synthesis gain K is determined by the ratio between the received signal level into correlator array (100) and synthesis output I and Q signal level.

Figure 12B:
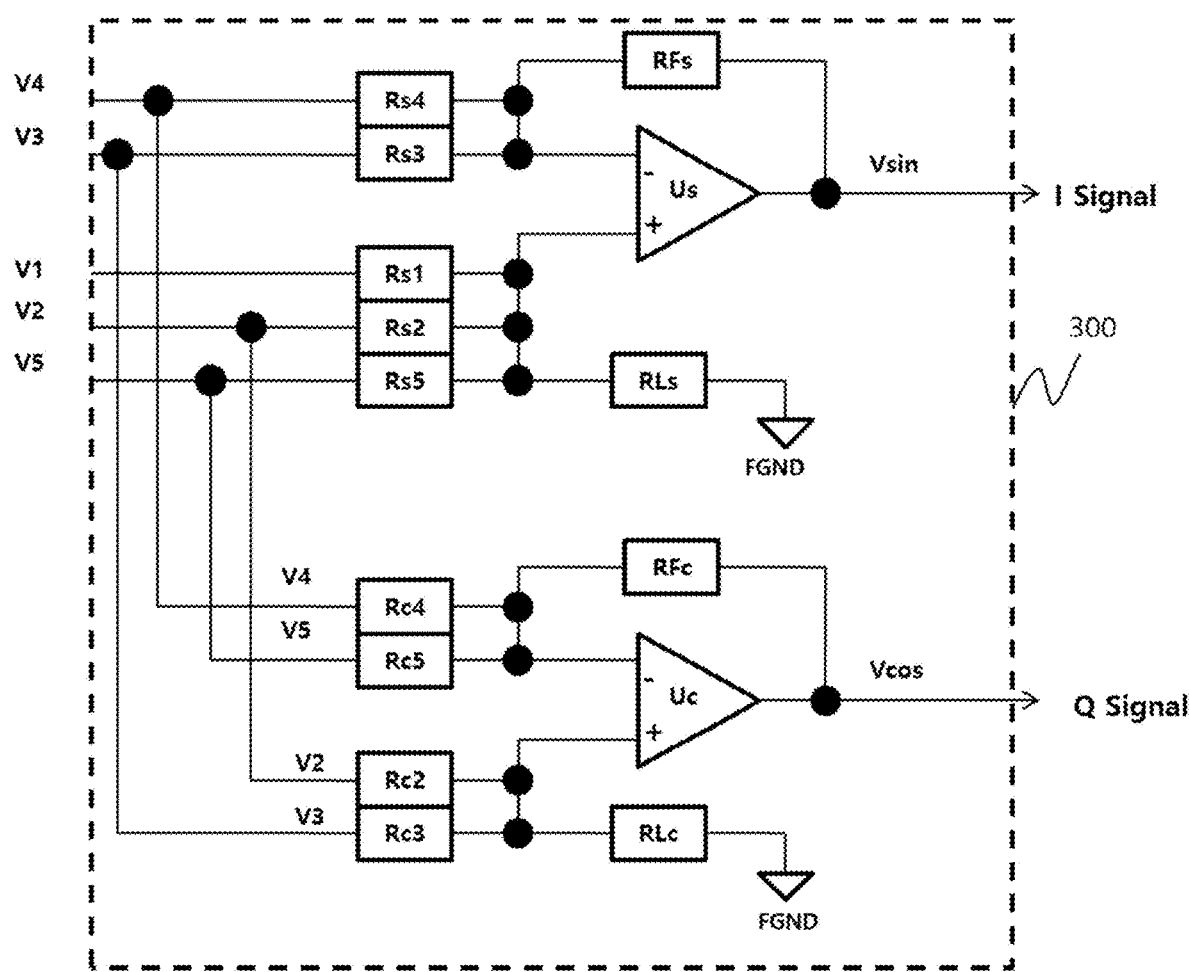
FIG. 12B draws an exemplary circuit of the zero-force synthesizer for N=5 case using analog operation amplifiers (OP-amps) according to the present invention.

The zero-force synthesizer can be conveniently implemented either by digital circuits or analog circuits. In FIG. 12B, an exemplary realization of the zero-force synthesizer using analog operation amplifiers (OP-amps) for N=5 case is drawn that is disclosed in KR10-2144254 by the present inventor.

Referring to FIG. 12B, under a specific condition of RFs=RLs=RFc=RLc, for the correlation vectors V1, V2, V3, V4, and V5, the values of input resistors to the OP-Amps are determined as follows: Rs1=RFs/(K*$a_1$), Rs2=RFs/(K*$a_2$), Rs3=RFs/(K*$a_3$), Rs4=RFs/(K*$a_4$), and Rs5=RFs/(K*$a_5$) for the I signal synthesis, and Rc1=RFc/(K*$b_1$), Rc2=RFc/(K*$b_2$), Rc3=RFc/(K*$b_3$), Rc4=RFc/(K*$b_4$), and Rc5=RFc/(K*$b_5$) for the Q signal synthesis. In principle, referring to EQ. (8), the I signal is obtained by a difference between Sp and Sm, where Sp is the sum of terms having (+) coefficients and Sm is the sum of terms having (−) coefficients. Likewise, referring to EQ. (9), the Q signal is obtained by a difference between Cp and Cm, where Cp is the sum of terms having (+) coefficients and Cm is the sum of terms having (−) coefficients.

In what follows, exemplary applications of the multi-phase vector synthesis ranging method disclosed in previous sections are presented.

Time-of-Flight (TOF) Systems

Figure 13:
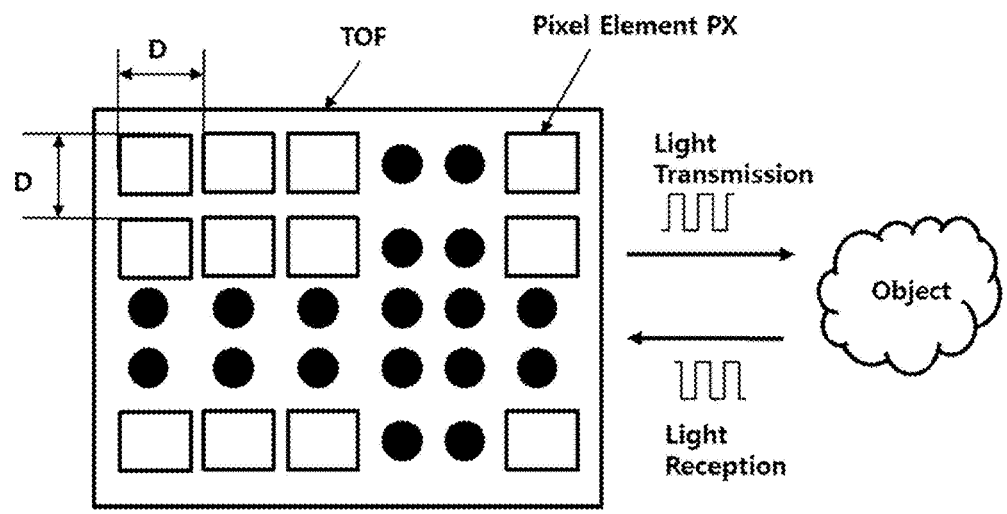
FIG. 13 illustrates a typical TOF sensor array comprising pixel elements and its operational principle.

As illustrated in FIG. 13, when a solid-state laser or LED illuminates a laser or infrared light to the object, each CCD or CMOS pixel element (PX) of TOF sensors in 2-dimensional array is designed to respond to the transmitting light, and convert the photonic energy to electrical charge or voltage.

Figure 14:
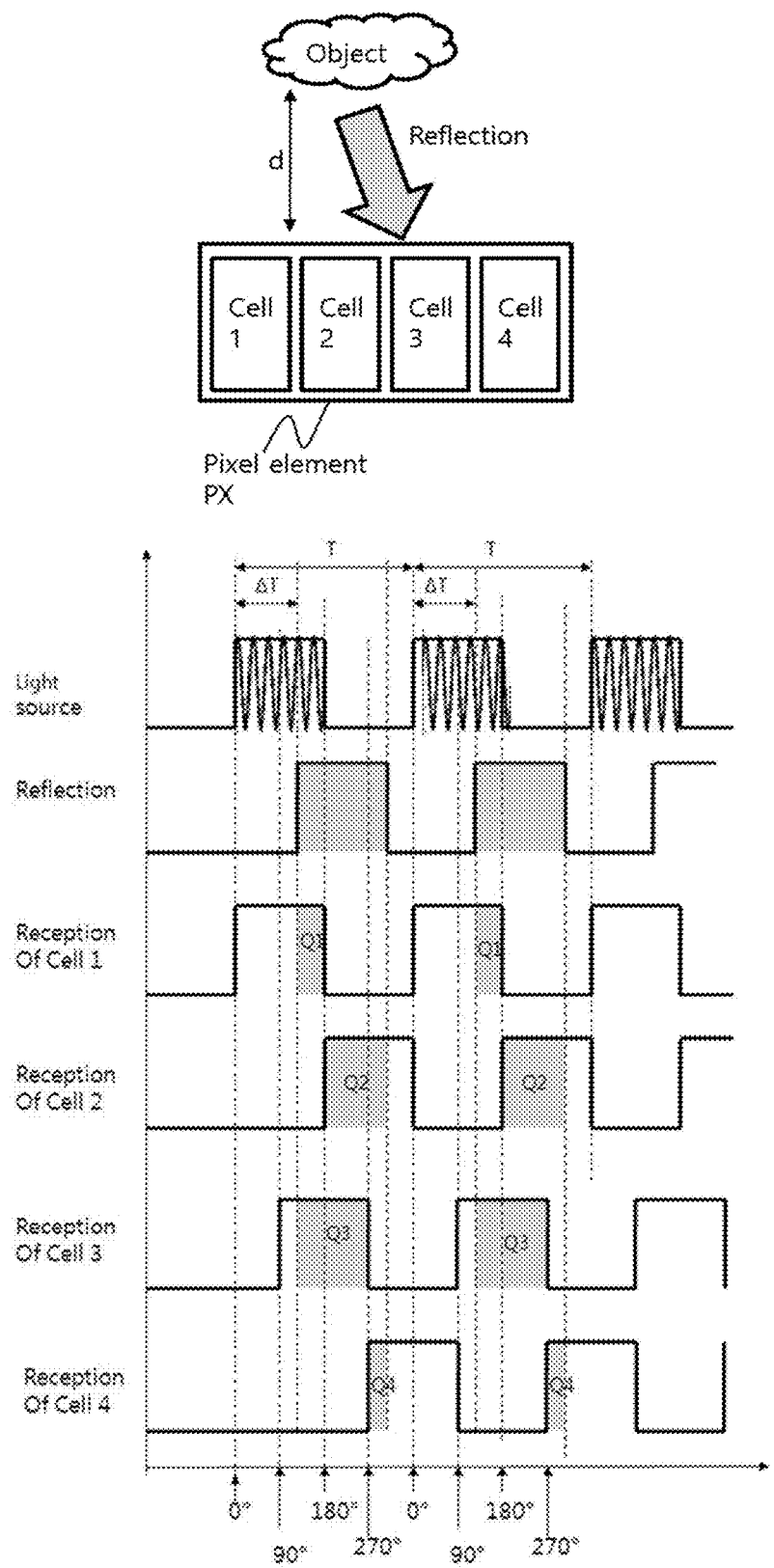
FIG. 14 illustrates operational signal waveforms of 4-phase correlations on 4-pixel elements in the conventional TOF system.

In FIG. 14, a simplified operating principle of the conventional TOF system is illustrated. Each pixel element (PX) comprises 4 cells (C1~C4), and each of 4 cells starts to operate at 0, 90, 180, and 270° phase of the periodic transmitting signal, respectively. Namely, Cell 1, Cell 2, Cell 3, and Cell 4 starts to accumulate photonic energy during the 0°~180°, 180°~360°, 90°~270°, and 270°~90° periods of the transmitting signal, respectively.

Let the photonic energy (or electrical charge) accumulated and sampled at C1, C2, C3, and C4 cells be Q1, Q2, Q3, and Q4, respectively, then the phase delay of the received light and corresponding distance between the transmitter and the object are calculated from the following EQ. (12) and EQ. (13) equations.

$$\phi = \tan^{-1}\left[\frac{Q3 - Q4}{Q1 - Q2}\right] \quad \text{EQ. (12)}$$

$$d = \frac{c}{4\pi f} \times \phi \quad \text{EQ. (13)}$$

As seen in EQ. (12) and (13), it is hard to expect an accurate resultant ranging since the phase delay or distance is directly calculated from the photonic energy charged on the 4 cells that are very susceptible to any noise, distortions, or high levels of ambient light. Moreover, EQ. (12) and (13) does not hold an important requirement that the correlator outputs should vary linearly with the phase delay, which necessitates an additional compensation process on phase delay calculated from the EQ. (12).

Figure 15:
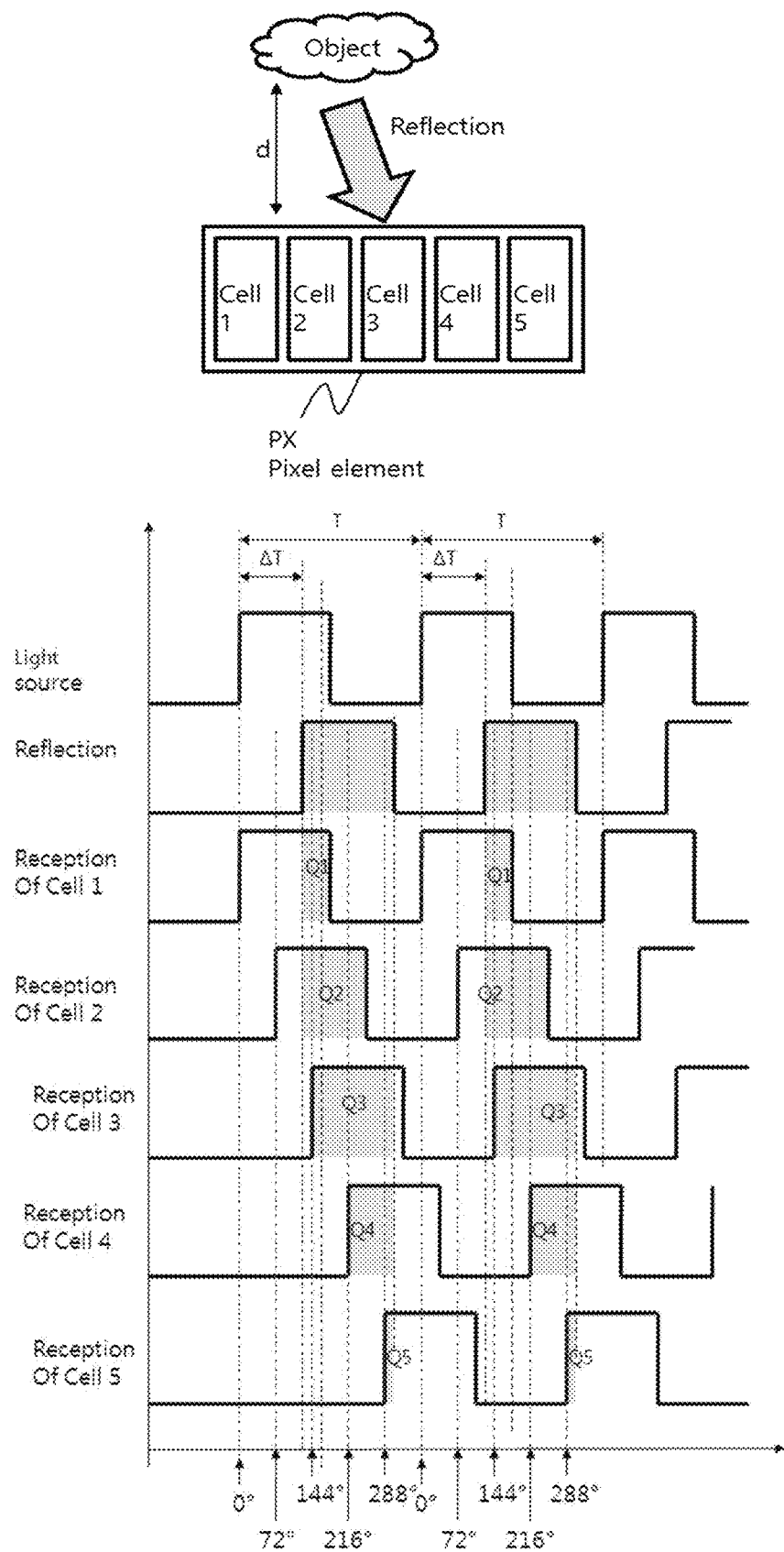
FIG. 15 illustrates operational signal waveforms of 5-phase correlations on 5 pixels according to the present invention.

In this regard, the multi-phase correlation vector synthesis method presented in this invention not only significantly reduces the unwanted signal components induced in the image cell, but also maintains the linearity relationship between the correlation output and the phase delay. FIG. 15 illustrates an exemplary configuration of TOF sensors and a brief operating principle employing S cells (C1~C5) per each pixel element (PX). Each of S cells C1, C2, C3, C4, and C5 starts to integrate at 0°, 72°, 144°, 216°, and 288° delay tap position of the transmitting signal, respectively, and accumulates photonic energy during integration periods. Let the electrical charge being accumulated in S cells C1, C2, C3, C4, and C5 be Q1, Q2, Q3, Q4, and Q5, then the correlation vectors V1, V2, V3, V4, and V5 in EQ. (4) can be replaced by Q1, Q2, Q3, Q4, and Q5 after finishing the charge accumulations, respectively.

Figure 16A:
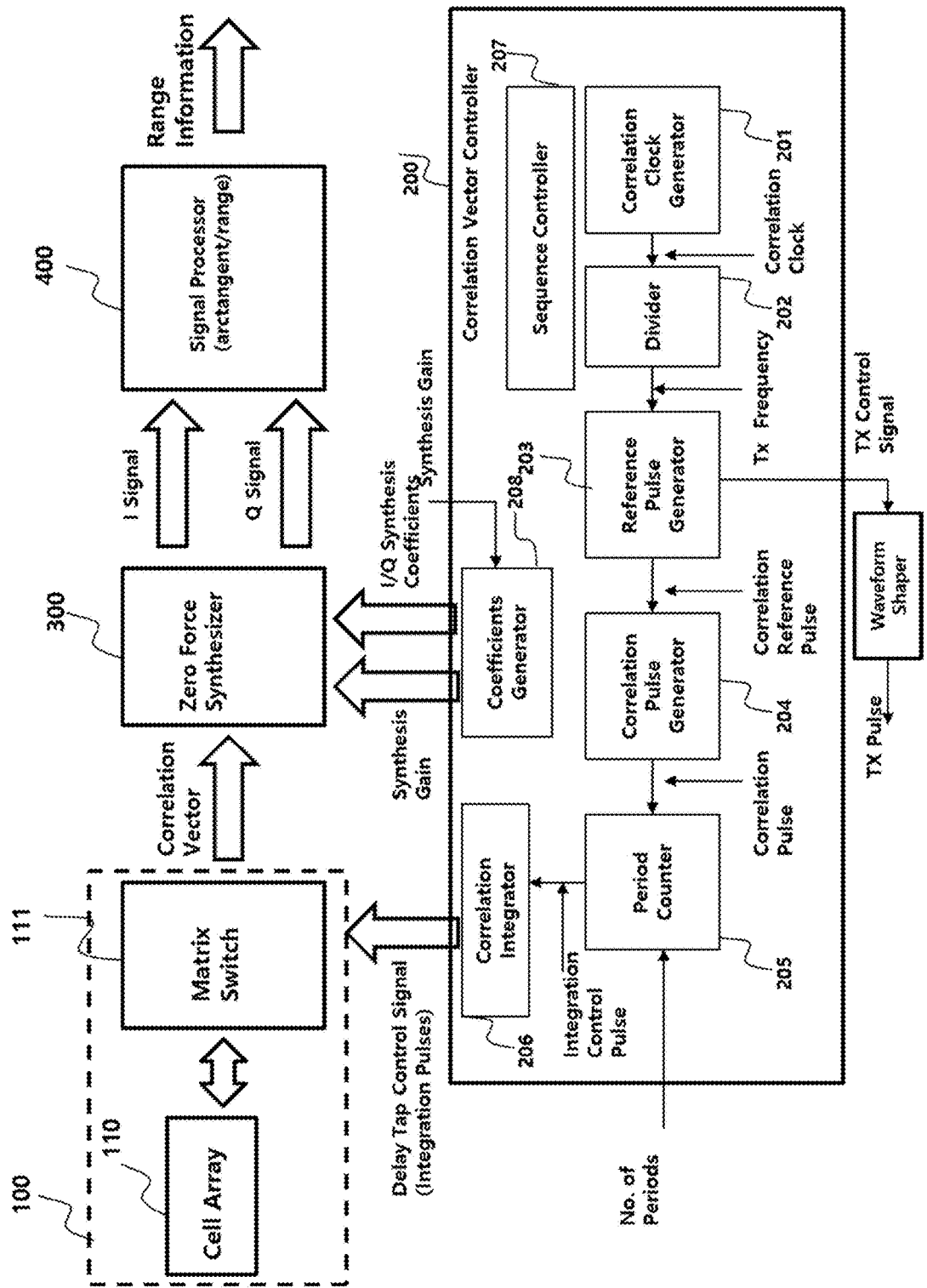
FIG. 16A illustrates an overall block diagram of exemplary TOF ranging system based on the multi-phase correlation vector synthesis according to the present invention.

An exemplary overall block diagram based on the multi-phase correlation vector synthesis is shown in FIG. 16A, where the correlator array (100) comprises a cell array (110) and a matrix switch (111) in generation of the correlation vectors. In this TOF sensor configuration, each pixel element has one cell, and the cell array can be regarded as a pixel array.

Dependent on applications, a few tens to a few thousands of cells (or pixels) are distributed in the cell array (110). The matrix switch (111) selects the cells to be correlated at row-wise or column-wise. The correlation vector controller (200), explained in FIG. 2B, sends delay taps control signal (or integration pulses) to the correlator array (100) and provides the synthesis gain and synthesis coefficients to the zero-force synthesizer (300) as well.

As explained in previous sections, under the control of the sequence controller (207), the correlation pulse generator (204) generates the correlation pulse and sends to the period counter (205) per every frame. The period counter (205) sends the number of periods to be integrated, pre-programmed by user, to the correlation integrator (206). The sequence controller (207) controls the whole process of correlation process, and sends the synthesis gain and I/Q synthesis coefficients to the zero-force synthesizer (300) once all N correlation vectors are obtained. When one frame is finished, the zero-force synthesizer (300) synthesizes the I and Q signals and sends to the signal processor (400), where the phase and range information is calculated.

Figure 16B:
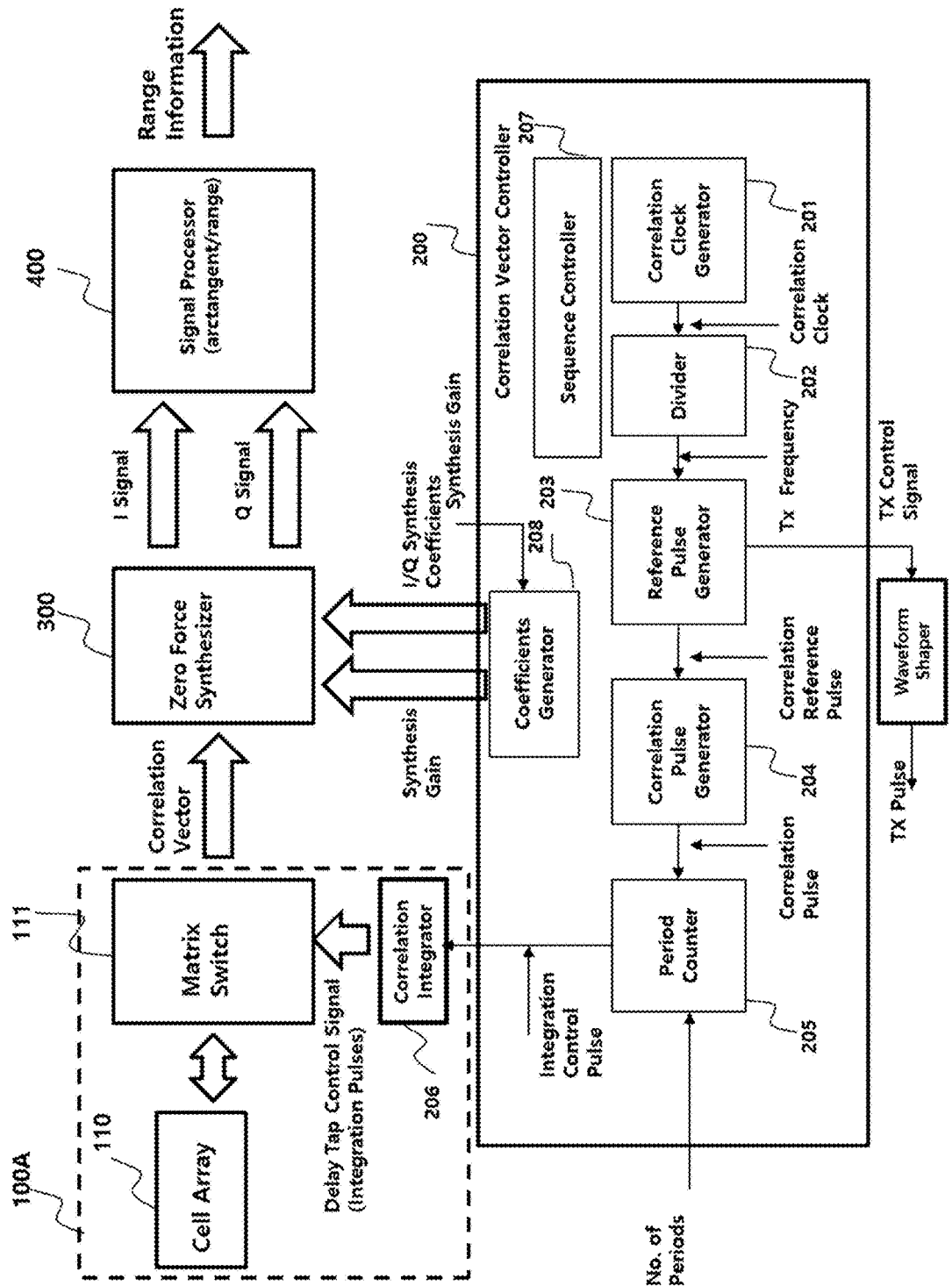
FIG. 16B illustrates an overall block diagram of another exemplary TOF ranging system based on the multi-phase correlation vector synthesis according to the present invention.
Figure 16C:
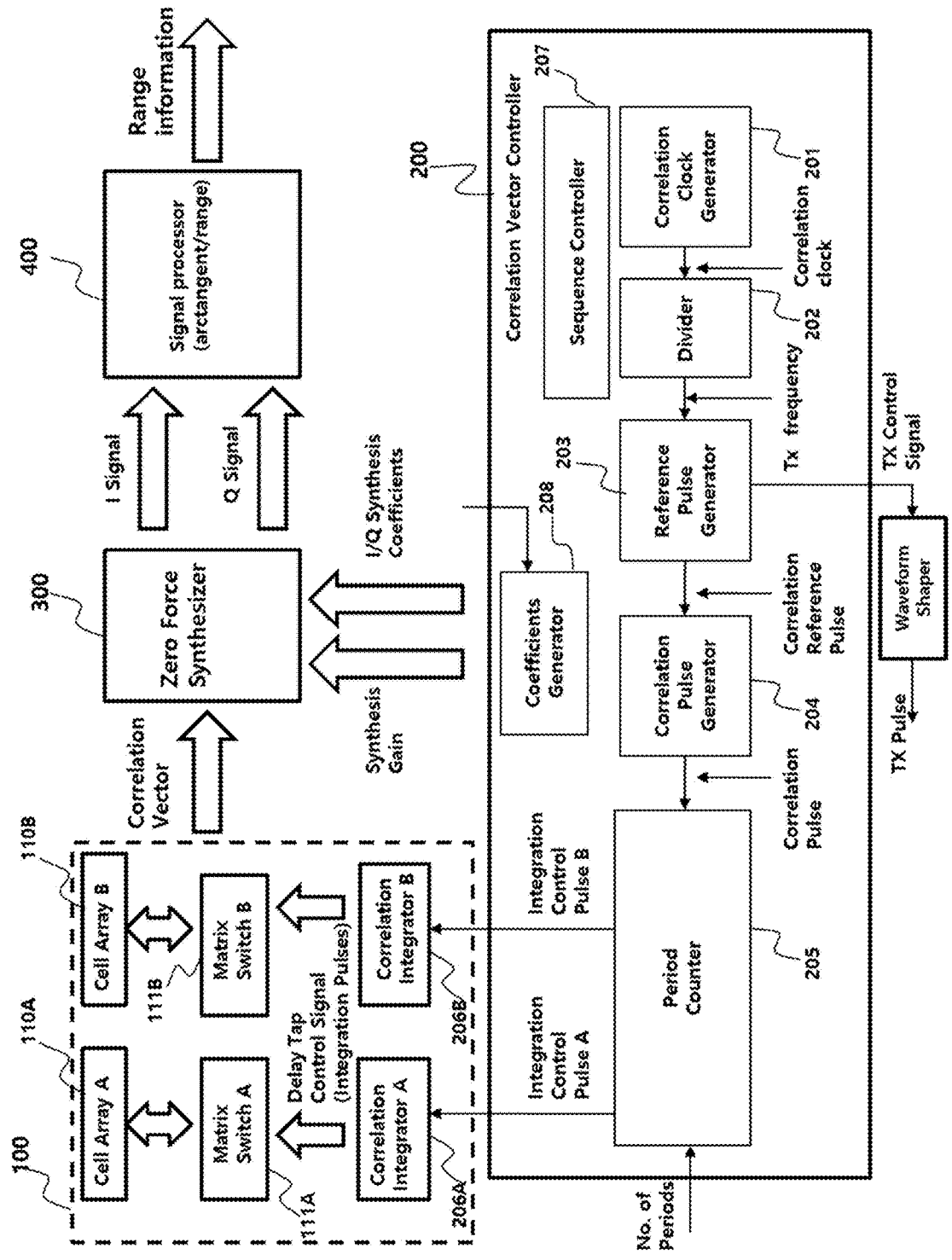
FIG. 16C illustrates an exemplary cell array split into two independent cell arrays in the TOF ranging system in FIG. 16B according to the present invention.

The correlation integrator (206) resides inside the correlation vector controller (200) in FIG. 16, but can be in the same substrate with the correlator array (100) as shown in FIG. 16B. In FIG. 16C, the correlator array (100) is split into two cell arrays, cell array A (110A) and cell array B (110B) that run independently. In this case, the correlation vector controller (200) needs to generate two independent integration control signals. Likewise, to reduce the integration time, when the N number of delay taps are employed, the N number of cell arrays can be used independently together with multiple zero-force synthesizers.

Performance Comparison

The performance between the multi-phase correlation vector synthesis TOF system (simply referred to as "multi-phase synthesis TOF") according the embodiments of the present invention and the conventional and typical 4 phase (0°, 90°, 180°, 270°) correlation TOF system (simply referred to as "normal quad TOF") is presented.

Figure 17A:
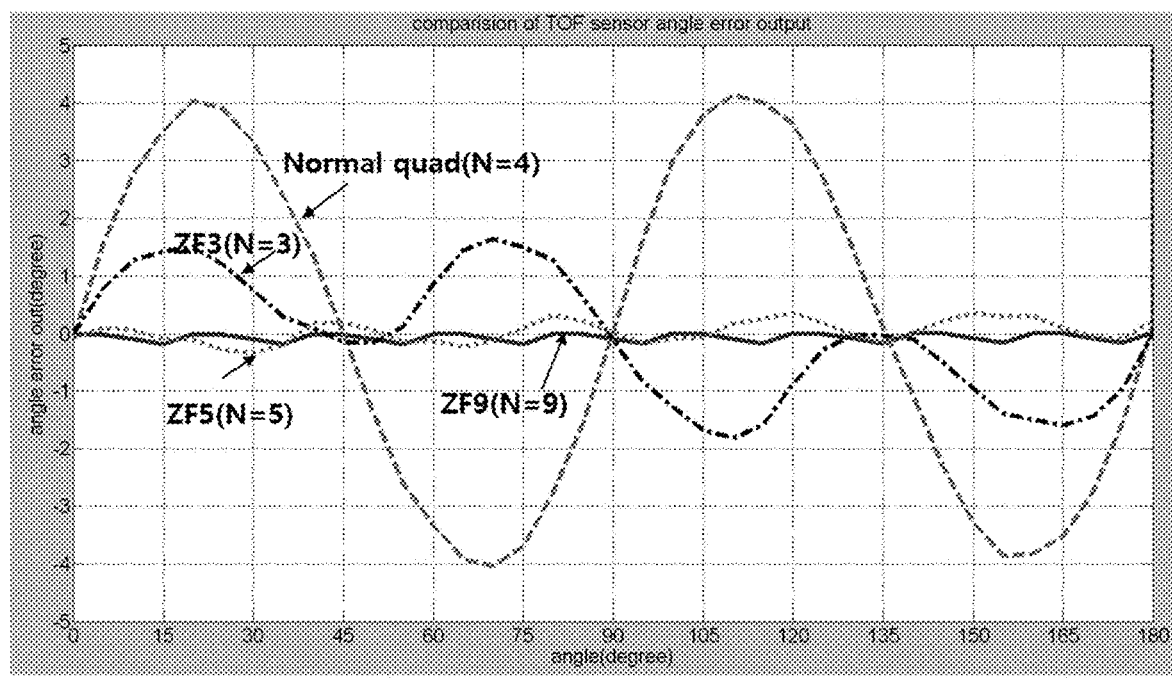
FIG. 17A draws measured phase error plots between the 3, 5, 9-phase correlations vector synthesis TOF ranging system and the conventional normal quad TOF ranging system when the received signal phase varies between 0° and 180°.

Computer simulations are performed on the multi-phase synthesis TOF for various N-phase cases in comparison with the normal quad TOP. In FIG. 17A, without any channel noise or impairments, the inherent measured error is drawn between the multi-phase synthesis TOF and the normal quad TOF as the phase of the received (or reflected) signal changes between 0° and 1800. Referring to FIG. 17A, under the ideal condition the measured range error is ±4° for the normal quad TOF, whereas the measured range error is ±1.50 for N=3 case of the multi-phase synthesis TOF. The measurement errors of ±4° and ±1.5° are translated into around ±16.5 cm and ±6.2 cm when 10 Mhz of signal is transmitted, respectively. Therefore, even though the multi-phase synthesis TOF uses one less correlator than the normal quad TOF uses, its performance improves at least double.

Figure 17B:
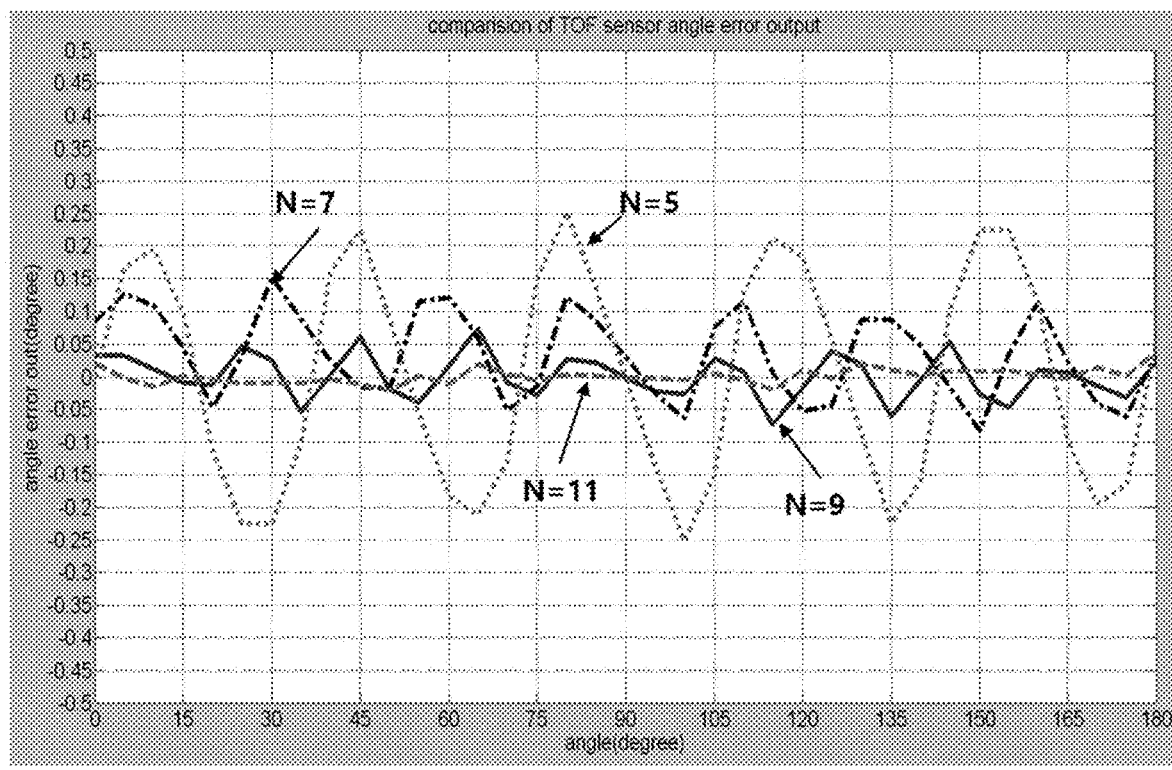
FIG. 17B draws measured phase error plots for 5, 7, 9, 11-phase correlations vector synthesis TOF ranging system when the received signal phase varies between 0° and 180°.
Figure 17C:
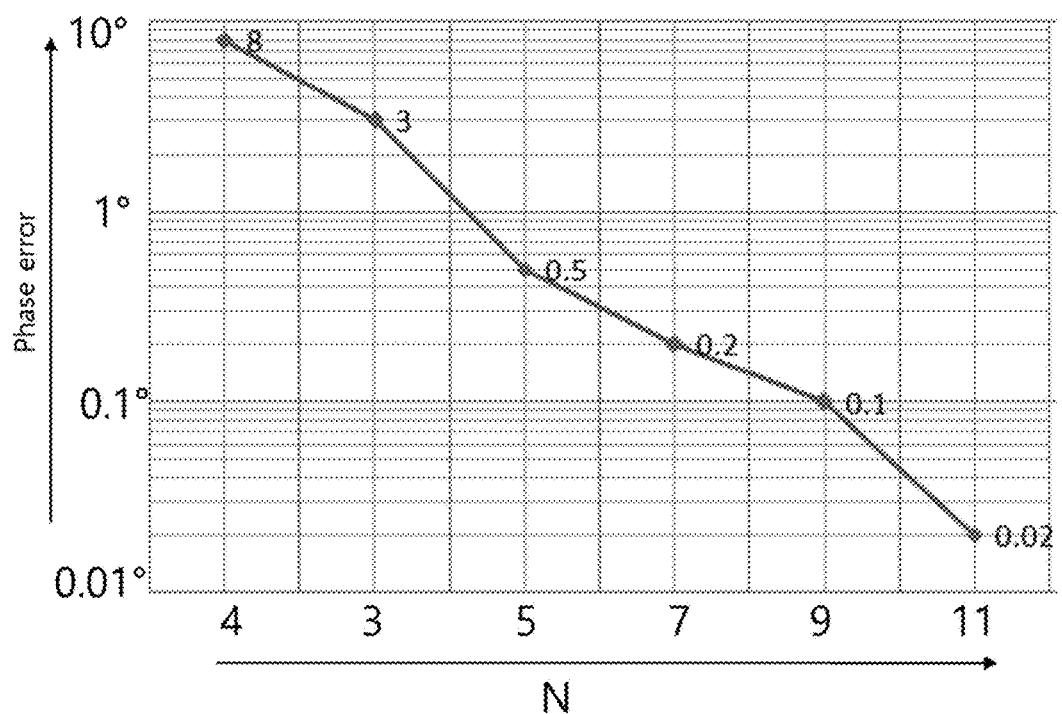
FIG. 17C draws measured maximum phase error plots in log scale for 5, 7, 9, 11-phase correlations vector synthesis TOF ranging system.

When N=5 and N=9 correlators are used in the multi-phase synthesis TOF, the measurement errors are greatly improved to ±0.25° (±1.05 cm) and ±0.05° (±0.2 cm), respectively in FIG. 17B. In FIG. 17C, the inherent measured errors for N=5, 7, 9, and 11 cases are drawn in more detail, where for N=11 case, the measurement error is shown to be only ±0.01° (±0.4 mm). FIG. 17C shows that the measurement errors decrease exponentially since the harmonic distortions decrease as the odd N number increases, where the measurement errors are the maximum errors in degree.

The measurement errors of ±16.5 cm provided by the conventional normal quad TOF makes it hard to distinguish between the head, hands, or legs of human beings, however, the measurement errors of ±1.05 cm or ±0.2 cm provided by the N=5 or N=7 case of the multi-phase synthesis TOF enable to distinguish them clearly. The measurement time would be longer as the number N increases. To be noted here is that when N is an even number, the measurement error improvement reduces by a half, namely, when N=10, the measurement error is almost equal to that of N=5 case.

3D Imaging System

By adopting the aforementioned TOF system based on the multi-phase correlation vector synthesis, a much-improved 3D imaging system can be constructed. The U.S. Pat. No. 10,638,118 B2 discloses a 3D imaging system comprising several cameras, at least one of the cameras being a TOF camera, wherein the cameras are assembled on a common substrate and are imaging the same scene simultaneously driven by different driving parameters, but with the absence of a detailed signal processing method and/or apparatus in its realization.

Figure 18A:
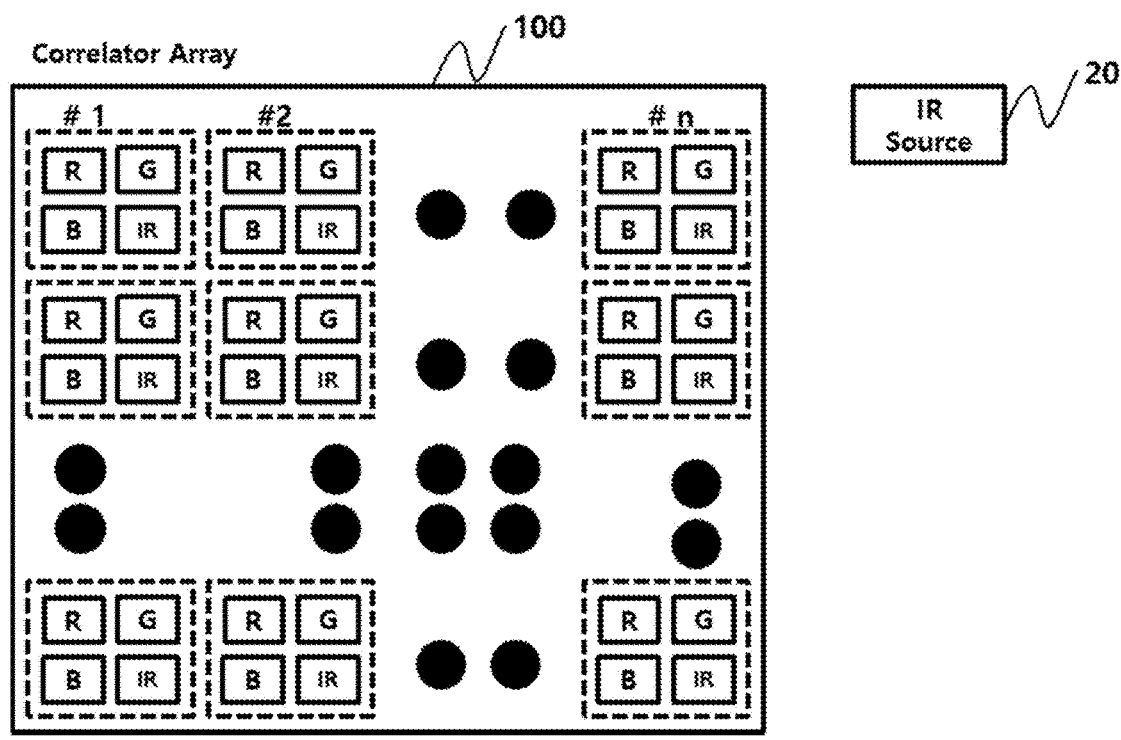
FIG. 18A illustrates an exemplary hybrid pixel array for 3D imaging system according to the present invention.

FIG. 18A illustrates a hybrid pixel array (100) for the 3D imaging system together with an infrared (IR) source transmitter (20) according to the present invention. As a correlator array, hybrid pixels ($HPX_1 \sim HPX_n$) are distributed in 2-dimensional. Each hybrid pixel comprises 4 sensors; R, G, and B sensors for red, green, and blue color signal, respectively, as well as an IR sensor for the infrared signal. The IR source transmitter (20) illuminates an infrared signal to a target object with period T in time, and the IR sensor in the hybrid pixel determines the distance of the object.

Figure 18B:
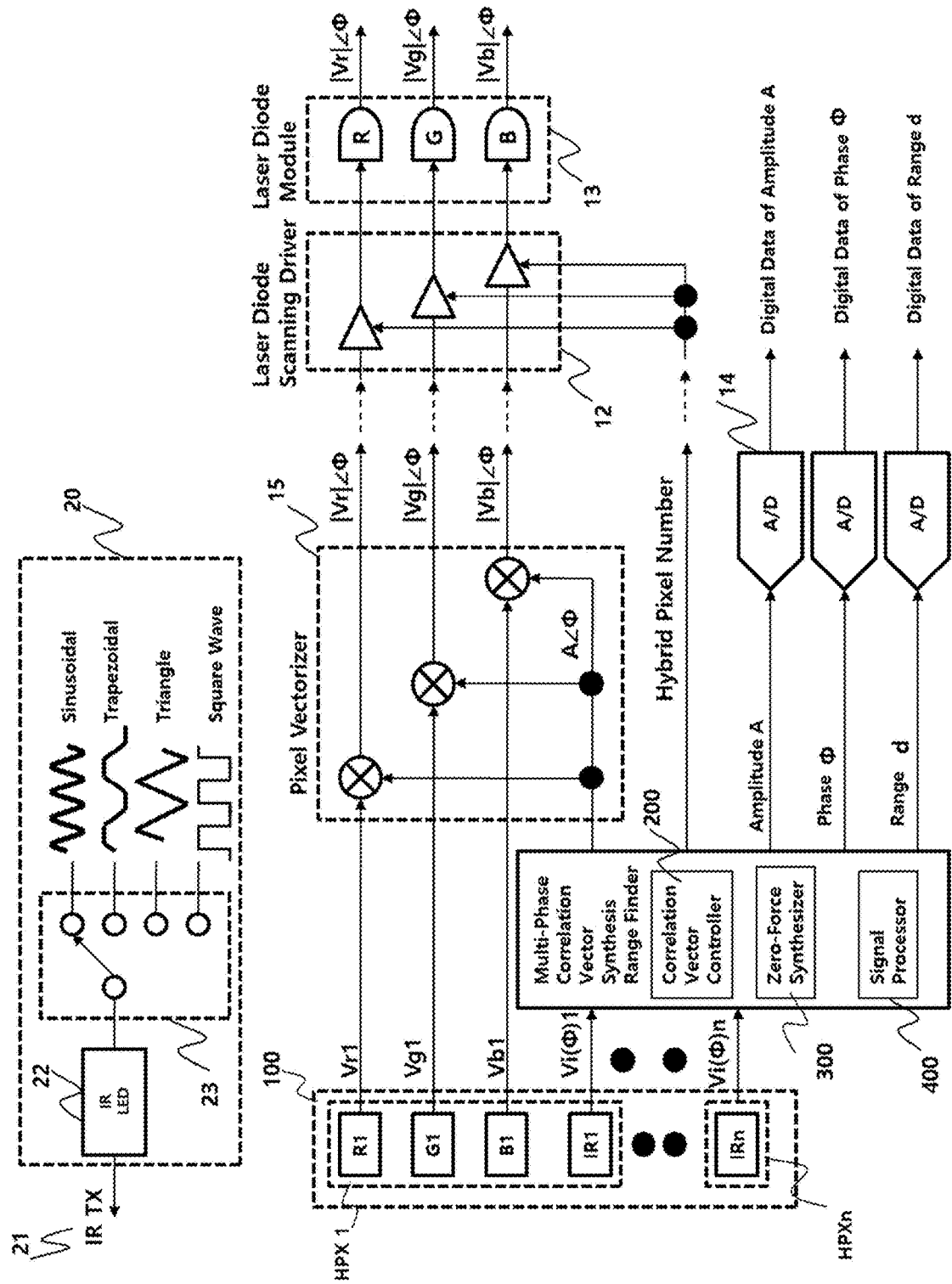
FIG. 18B draws an overall functional block diagram of exemplary 3D imaging system according to the present invention.

In FIG. 18B, the overall functional block diagram of an exemplary 3D imaging system is illustrated according to the present invention. The IR transmitter (20) transmits an infrared signal (21) from an IR LED (22) that is intensity modulated by one of the following 4 waveforms selectable from the switch (23); sinusoidal, trapezoidal, triangular, or square waveforms. The visible light pixels, R1, G1, and B1 in the hybrid pixel array $HPX_1$ (100) in FIG. 18B, contain a complete scalar image information about the pixel #1. The distance information for the pixel #1 is obtained from the $IR_1$ sensor in hybrid pixel $HPX_1$ from the phase delay between the modulated IR signal from IR transmitter (20) and the received signal.

As disclosed in previous sections, a group of N correlation vectors are generated from N delay taps positions that are equally partitioned over one period (360°) of the transmitting signal, where N is preferred to be an odd number greater than or equal to 3. To obtain the phase delay (Ø) between the transmitting signal and the received signal for the pixel #n, $IR_n$ is selected as the reference pixel among IR sensors ($IR_1 \sim IR_N$) in a group of pixels ($HPX_1 \sim HPX_N$). After illuminating IR signal to the object, N correlation vectors accumulated at IR sensors ($IR_1 \sim IR_N$) are sent to zero-force synthesizer (300) and the phase delay information (A∠Ø) is calculated at the signal processor (400). The phase delay information (A∠Ø) is multiplied to the image $R_n$, $G_n$, $B_n$ scalar signals at the pixel vectorizer (15) for the pixel #n, which results in a complex number containing the distance information. The magnitudes of R, G, and B signals of a pixel are expressed by $|V_r|\angle Ø$, $|V_g|\angle Ø$, and $|V_b|\angle Ø$, respectively. As illustrated in FIG. 18B, those R, G, B signals, as having their magnitudes and phases, can be displayed in 3D depth image by a laser diode module (13) driven by a laser diode scanning driver (12).

Typically, in representing the true color image in digital signal format, the R, G, B scalar signal is analog-digital (A/D) converted into 8 bits digital signal. The amplitude, phase, and range (distance information) of the received signal for the selected pixel can be also analog-digital (A/D) converted, where the number of bits in digital signal conversion depends on the waveform type of transmitting signal and the number of N correlation vectors (or taps). For the same N number of taps, the sinusoidal signal provides the highest resolution, while the square waveform signal yields the lowest resolution. When the transmitting signal is trapezoidal or triangular, the depth resolution depends on the total harmonic distortion (THD) of the transmitting signal. The optimal resolution may depend on the applications, however, it can be fully predicted and estimated from its mathematical model and computer simulation.

3D Sonar Imaging System

SONAR (sound navigation and ranging) systems are used in exploring and mapping the ocean because sound waves travel farther in the water than do radar and light waves. Sonar transducers emit an acoustic signal or pulse of sound to the object, and the wave propagates to the object and back to the receiver. The advances of semiconductor technology have driven the accuracy, efficiency, and miniaturization of sonar systems, and enable the construction of a cylindrical shape of sonar detection sensors.

Figure 19A:
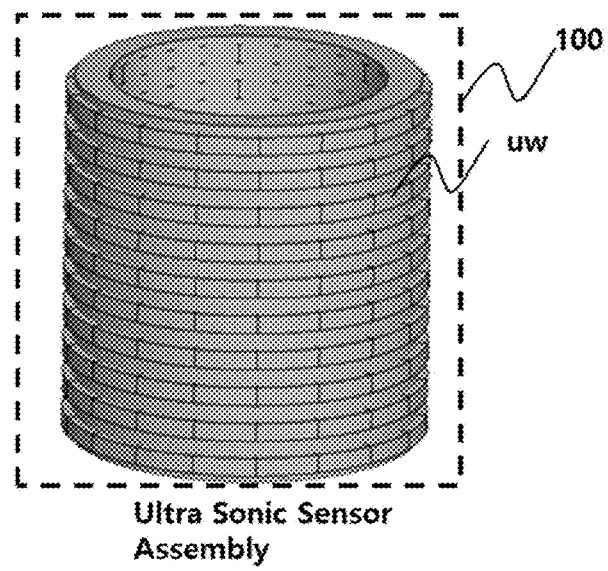
FIG. 19A illustrates an exemplary ultrasonic sensor assembly for 3D sonar imaging system according to the present invention.
Figure 19B:
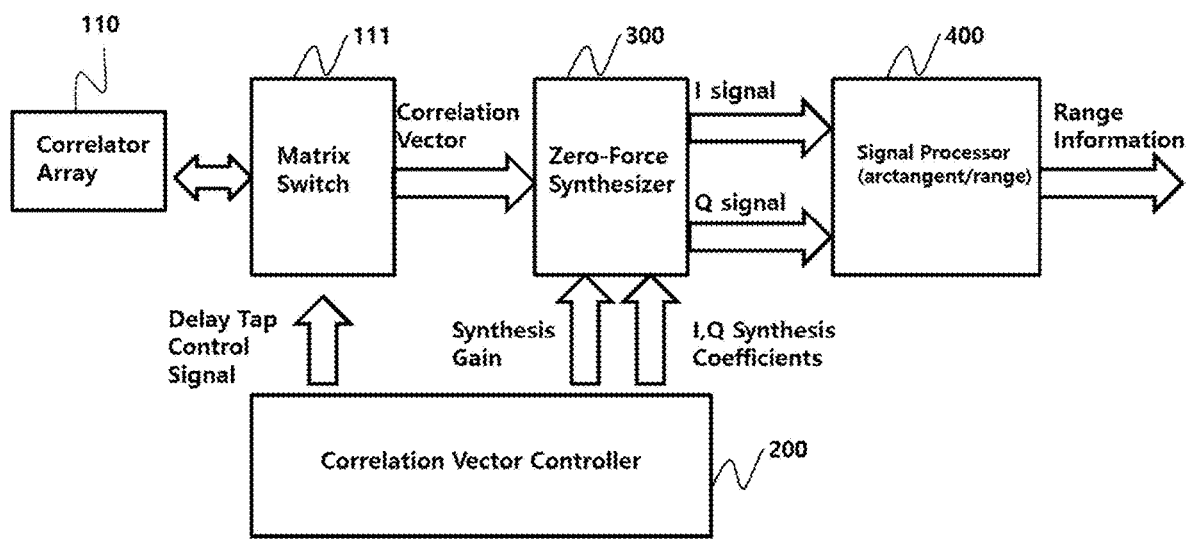
FIG. 19B draws an overall functional block diagram of exemplary 3D sonar imaging system according to the present invention.

FIG. 19A an illustrates an exemplary ultrasonic sensor assembly (100), where the correlator array comprises cylindrical 3D ultrasonic wave (UW) sensors that detect the sonar signals from 360° angles. FIG. 19B draws an exemplary block diagram of the 3D sonar imaging system according to the present invention.

As described in previous sections, a group of N correlation vectors are generated from N delay taps positions that are equally partitioned over one period (360°) of the transmitting signal, where N is preferred to be an odd number greater than or equal to 3.

3D Touchless Pointer System

Another application that benefits from the improved ranging accuracy of the TOF method based on the multi-phase correlation vector synthesis is a 3D touchless pointer system. The 3D touchless pointer system enables one to point to a certain location on a screen from a distance position by steering a pointer without touching the screen. Commercially available 3D touchless pointer systems are not widely used due to the lack of their pointing accuracy.

Figure 20A:
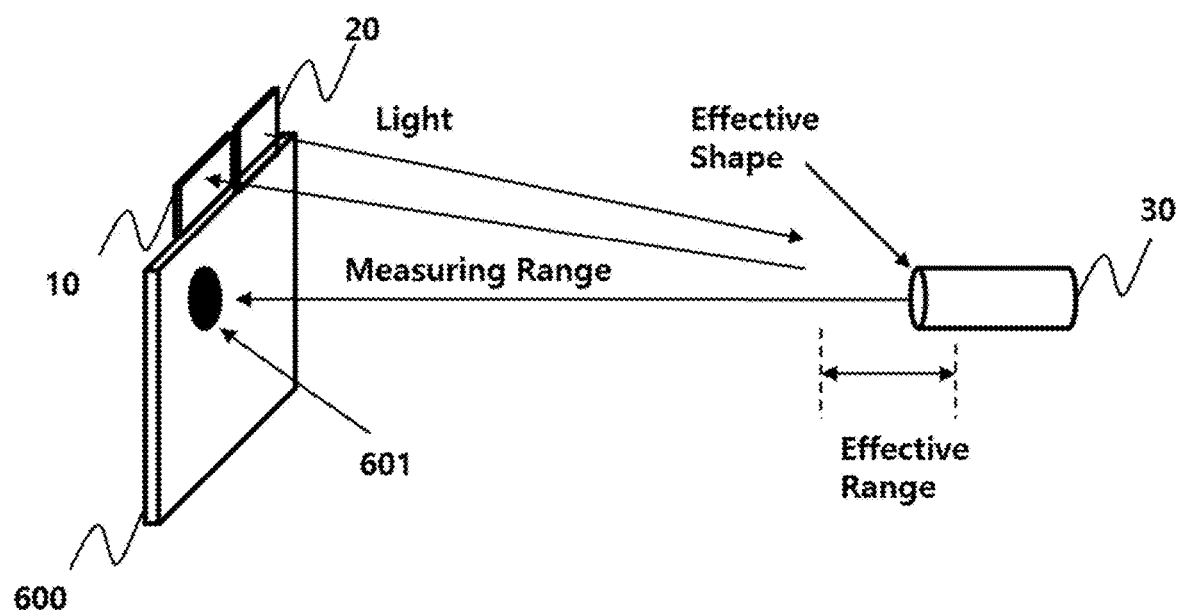
FIG. 20A illustrates the operational principle of an exemplary 3D touchless pointer according to the present invention.

In FIG. 20A, the operational principle of the 3D touchless pointer system according to the present invention is illustrated. In a flat panel display (600), a light source (20) and a TOF apparatus (10) that are configured to range and detect a pointer (30) of a specific shape are additionally installed.

In general, since the resolution of the flat panel display is much higher than that of the TOF apparatus (10) can detect, the position of the pointer (30) can be appropriately displayed on the screen in a way of 1:1 ratio mapping. The light source (20) periodically illuminates a modulated light toward the pointer (30), and the TOF apparatus detects the specific shape and tracks the distance of the pointer (30). When the TOF apparatus detects the shape of the pointer within a certain distance, cell coordinates of a touched point (601) are recognized, and displayed on the screen of flat panel display (600). The display size of the touched point (601) is determined by the mapping ratio that is determined from the ratio between the display resolution of the flat panel display and the distance resolution of the TOF apparatus.

Figure 20B:
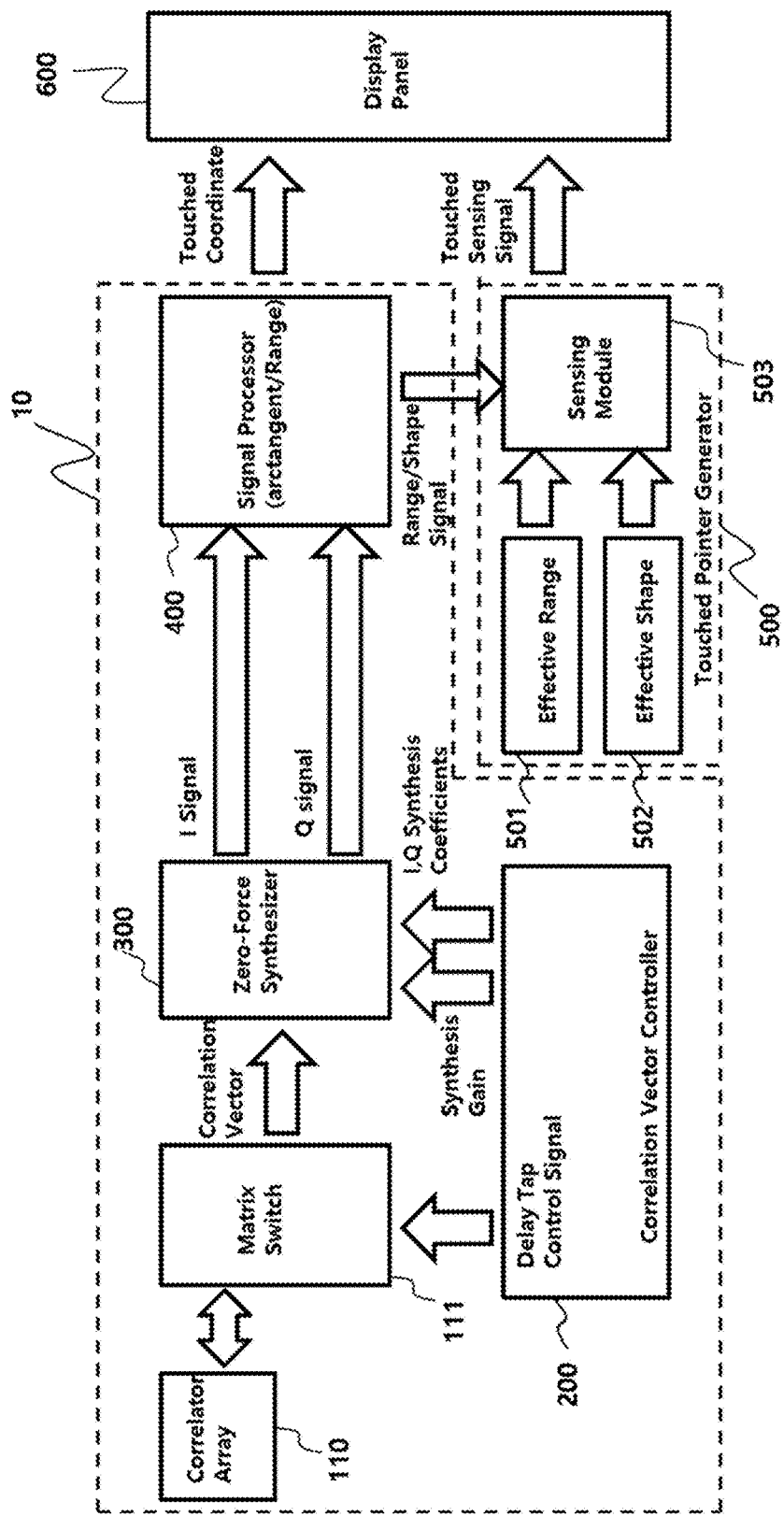
FIG. 20B draws an overall functional block diagram of exemplary 3D touchless pointer according to the present invention.

FIG. 20B illustrates a block diagram of an exemplary 3D touchless pointer system comprising a TOF apparatus (10), a touched pointer generator (500), and a flat panel display (600). The TOF apparatus (10), which is the identical block (10) in FIG. 16A, processes the modulated and reflected light, and sends the phase delay information to the signal processor (400). The distance information of the image is sent to a sensing module (503) of the touched pointer generator. The pre-determined effective working shape and effective working distance information are stored locally in non-volatile memory called effective shape (502) and effective range (501) by the user, respectively.

Upon receiving the distance information, the touched pointer generator (500) compares with an effective working shape and an effective working distance. Once the constructed image and distance information are within locally stored data, a sensing module (503) sends the activation signal to the display panel (600) along with the corresponding coordinates of the pointer (30). Display panel (600) displays the received coordinates on the screen, from which it is recognized that the pointer is detected as pointing to a certain location on the screen. Additional functions like data transmission can be integrated into the 3D touchless pointer system by installing an auxiliary switch.

The newly proposed multi-phase correlation vector synthesis ranging method is a generalized expansion from the conventional 2-phase correlations or 4-phase correlations receivers to arbitrary N-phase correlations, where N is preferred to be an odd number greater than or equal to 3. The correlation vectors from the multi-phase correlators output are further processed by the zero-force synthesizer to produce an optimal in-phase and quadrature-phase signals. In the process zero-force synthesis, distortions, fluctuations, and other non-linear noise induced in the received signal are significantly reduced. One of the advantages of applying the method of multi-phase correlation vector synthesis to the TOF systems is that the phase delay detected in the received signal from the object varies linearly to the distance between the transmitter and the object. Owing to this linearity property, finer and more accurate TOF systems including, but are not limited to, 3D imaging systems, 3D sonar imaging systems, or 3D touchless pointer systems can be constructed. The embodiment of the invention mainly describes on the TOF ranging systems because of their recent interest in 3-dimensional imaging applications, but the method and apparatus presented in this invention can also be fully applied to phase modulated digital communications in general.

What is claimed is:

1. A method for measuring a distance between a transmitter and an object based on a phase delay between a transmitting signal and a reflected signal received at a receiver, the method comprising:
   (a) generating a correlation clock, whose frequency is p*N times a frequency of the transmitting signal, where p is an integer greater than or equal to 1 and N is an odd number greater than or equal to 3;
   (b) generating a transmitting control signal from a clock divider that divides the correlation clock by p*N, wherein the transmitting control signal shifts its phase by 180° at every p*N/2 cycles of the correlation clock;
   (c) generating an N number of delay taps control signals, wherein each of the delay taps control signals is sequentially p cycles of the correlation clock delayed, wherein phase positions of an N number of delay taps constitute N equally divided phase positions over one period (360°) of the transmitting control signal;
   (d) obtaining each of an N number of correlation vectors $V_1, V_2, \ldots, V_N$ by accumulating one or multiple periods of correlations at the receiver between the reflected signal and the transmitting signal synchronized to each of the N delay taps control signals corresponding to each of the N number of correlation vectors;
   (e) synthesizing in-phase (I) and quadrature-phase (Q) signals from the N number of correlation vectors $V_1, V_2, \ldots, V_N$ by a zero-force synthesis using pre-determined synthesis coefficients and gain; and
   (f) determining distance information from the phase of in-phase (I) and quadrature-phase (Q) signals.

2. The method according to claim 1, wherein in the step (e), the I and Q signals are synthesized by $1^{st}$ order linear transformations after applying K times synthesis coefficients $a_1, a_2, \ldots, a_N$, and $b_1, b_2, \ldots, b_N$, respectively, where K is a synthesis gain.

3. The method according to claim 1, wherein when p is an odd number, the transmitting control signal is active at the rising edge and inactive at the falling edge of the correlation clock after p*N/2 clock cycles, or the transmitting control signal is active at the falling edge and inactive at the rising edge of the correlation clock after p*N/2 clock cycles.

4. The method according to claim 1, wherein when p is an odd number, the N delay taps control signals are active at the rising edge and inactive at the falling edge of the correlation clock after p*N/2 clock cycles, or the N delay taps control signals are active at the falling edge and inactive at the rising edge of the correlation clock after p*N/2 clock cycles.

5. The method according to claim 1, wherein a certain time-delay offset ±τd is applied to the N delay taps control signals at reference delay taps positions, wherein the reference delay taps positions are the N equally divided phase positions over one period (360°) of the transmitting control signal.

6. A distance measurement apparatus for measuring a distance between a transmitter and an object based on phase delay between a transmitting signal and a reflected signal received at a receiver, the distance measurement apparatus comprising:
   a correlator array that comprises an N number of correlators and generates an N number of correlation vectors by integration for one or multiple periods of the reflected signal, wherein the N number of correlators start correlations sequentially at an N equally divided phase positions over one period (360°) of a transmitting control signal, where N is an odd number greater than or equal to 3;
   a correlation clock generator that generates a correlation clock, whose frequency is p*N times a frequency of the transmitting control signal, where p is an integer greater than or equal to 1;
   a reference pulse generator that generates a correlation reference pulse and the transmitting control signal from a clock divider that divides the correlation clock by p*N, wherein the phases of the correlation reference pulse and the transmitting control signal are shifted by 180° at every p*N/2 clock cycles of the correlation clock;
   a correlation pulse generator that generates a correlation pulse, wherein the correlation pulse comprises an N number of pulses, whose phases are same to those of an N number of delay taps control signals, wherein each of the N number of delay taps control signals is sequentially p cycles of the correlation clock shifted with reference to the transmitting control signal, and shifts its phase by 180° at every p*N/2 clock cycles of the correlation clock;

a correlation integrator that generates the N number of delay taps control signals to detect an N number of correlation vectors $V_1, V_2, \ldots, V_N$ by accumulation of integration for one or multiple periods of the reflected signal.

7. The distance measurement apparatus according to claim 6, further comprising:

a zero-force synthesizer for synthesizing in-phase (I) and quadrature-phase (Q) signals from the N number of correlation vectors $V_1, V_2, \ldots, V_N$;

a signal processor for calculating phase and distance information from the in-phase (I) and quadrature-phase (Q) signals.

8. The distance measurement apparatus according to claim 7, wherein the zero-force synthesizer synthesizes the in-phase (I) and quadrature-phase (Q) signals by $1^{st}$ order linear transformations to the N number of correlation vectors after applying K times synthesis coefficients $a_1, a_2, \ldots, a_N$ and $b_1, b_2, \ldots, b_N$, respectively, where K is a synthesis gain.

9. The distance measurement apparatus according to claim 8, wherein the zero-force synthesizer is implemented by differential OP-amp circuitry, the differential OP-amp circuitry comprising:

input coefficient resistors corresponding to the synthesis coefficients having (+) values which are connected to the (+) input port of a differential OP-amp, and input coefficient resistors corresponding to the synthesis coefficients having (−) values which are connected to the (−) input port of the differential OP-amp, wherein the synthesis gain K is adjusted by a ratio between a resistance value of a feedback gain resistor of the OP-amp and a resistance value of each corresponding input coefficient resistor.

10. The distance measurement apparatus according to claim 6, wherein when p is an odd number, the delay taps control signals and the transmitting control signal are configured to be active at the rising edge and inactive at the falling edge of the correlation clock after p*N/2 clock cycles, or to be active at the falling edge and inactive at the rising edge of the correlation clock after p*N/2 clock cycles.

11. The distance measurement apparatus according to claim 10, wherein the delay taps control signals and the transmitting control signal are configured to be logical OR between a Flip-Flop #1 and a Flip-Flop #2, wherein the Flip-Flop #1 is triggered by the rising edge of the correlation clock and the Flip-Flop #2 is triggered by the falling edge of the correlation clock.

12. The distance measurement apparatus according to claim 6, further comprising:

a correlator array group comprising two or more correlator arrays, wherein each correlator array performs an independent correlation and integration.

13. The distance measurement apparatus according to claim 6, further comprising:

a correlator header array comprising the correlator array and the correlation integrator, wherein the correlator array and the correlation integrator are implemented in a common substrate or printed circuit board (PCB).

14. The distance measurement apparatus according to claim 6, wherein a total integration time during which the correlator array is exposed to the reflected signal is equal to a period of the transmitting signal multiplied by the number of integration periods.

15. The distance measurement apparatus according to claim 6, wherein the correlator array, associated with the transmitting signal, is configured to receive RF wave, optical, or ultrasonic signals.

16. The distance measurement apparatus according to claim 7, further comprising:

a zero-force synthesizer group comprising two or more independent zero-force synthesizers, wherein each zero-force synthesizer processes the correlation vectors of each correlator array independently with other zero-force synthesizers.

17. The distance measurement apparatus according to claim 7, further comprising:

a multi-phase correlation and vector synthesis ranging apparatus, wherein the multi-phase correlation and vector synthesis ranging apparatus comprises:

a correlator array configured to:
 include an infrared (IR) sensor in reception of a periodic and amplitude modulated infrared signal; and
 receive reflected signals from an object; and a sequence controller configured to:
 control a process of obtaining a frame constituting the N number of correlation vectors;
 execute a sequence to obtain each of the N number of correlation vectors by accumulating over one or multiple periods of integration synchronized to corresponding each of the N number of delay taps control signals; and
 repeat each sequence until one frame of all N number of correlation vectors are processed.

18. The distance measurement apparatus according to claim 17, further comprising:

a multi-phase correlation and vector synthesis 3D imaging apparatus, wherein the multi-phase correlation and vector synthesis 3D imaging apparatus comprises:

a correlator array configured to:
 include hybrid pixels, wherein each hybrid pixel comprises an image sensor of red (R), green (G), blue (B) and an infrared (IR) sensor;
 provide electric charge levels of red color (VR), green color (VG), blue color (VB) for each pixel, wherein the electric charge levels are scalar numbers; and
 calculate a phase delay from correlation vectors obtained from the IR sensor for each pixel; and a pixel vectorizer configured to provide a ranging information for each pixel in vector form by multiplying the phase delay information to the electric charge levels of red color (VR), green color (VG), blue color (VB), respectively.

19. The distance measurement apparatus according to claim 17, further comprising:

a multi-phase correlation and vector synthesis touchless pointer apparatus, wherein the multi-phase correlation and vector synthesis touchless pointer apparatus comprises:

a flat panel display configured to display a position of a recognized pointer in 2 dimensional coordinates; and a touched pointer generator including a sensing module configured to:
 recognize whether a constructed image of a pointer is within an effective shape that is pre-stored in memory;
 determine whether distance information of a pointer is within an effective range that is pre-stored in memory; and send an activation signal to the flat panel display along with corresponding coordinates of the recognized pointer determined from the sensing module.

\* \* \* \* \*